US007839962B2

(12) United States Patent
Jechoux et al.

(10) Patent No.: US 7,839,962 B2
(45) Date of Patent: Nov. 23, 2010

(54) METHOD FOR SYNCHRONISING A SIGNAL FRAME OF A SIGNAL TRANSMITTED FROM A TRANSMITTER TO A RECEIVER OF A TELECOMMUNICATION SYSTEM

(75) Inventors: Bruno Jechoux, Rennes Cedex (FR); Loic Brunel, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 798 days.

(21) Appl. No.: 11/695,249

(22) Filed: Apr. 2, 2007

(65) Prior Publication Data

US 2007/0242789 A1    Oct. 18, 2007

(30) Foreign Application Priority Data

Apr. 4, 2006 (EP) ................... 06290556

(51) Int. Cl.
*H04L 7/00* (2006.01)
(52) U.S. Cl. ...................... 375/354; 375/365
(58) Field of Classification Search .......... 375/354, 375/365, 229; 370/335, 350, 343
See application file for complete search history.

(56) References Cited

U.S. PATENT DOCUMENTS

2002/0165003 A1   11/2002   Rudolf et al.

FOREIGN PATENT DOCUMENTS

WO    WO 00/54424    9/2000

OTHER PUBLICATIONS

S.L. Maskara, et al., "Concatenated Sequences for Spread Spectrum Systems", IEEE Transactions on Aerospace and Electronic Systems, IEEE Service Center, vol. AES-17, No. 3, XP-000791008, ISSN: 0018-9251, May 1981, pp. 342-350.

S. Z. Budisin, "New Complementary Pairs of Sequences", 8030 Electronics Letters, Stevenage, Herts.. GB, vol. 26, No. 13, XP 000107922, ISSN: 0013-5194, Jun. 21, 1990, 4 Pages.

"New RACH Preambles with Low Auto-Correlation Sidelobes And Reduced Detector Complexity",Ericsson, 0 TSG-RAN Working Group 1 Meeting No. 3, XP002901242, Mar. 22-26, 1999, pp. 1-8.

*Primary Examiner*—Khai Tran
(74) *Attorney, Agent, or Firm*—Oblon, Spivak, McClelland, Maier & Neustadt, L.L.P.

(57) ABSTRACT

The present invention relates to a method for synchronizing a signal frame transmitted by a transmitter of a telecommunication system to a receiver adapted to synchronize said signal frame from a synchronization sequence included in said signal frame. The method is characterized in that it includes:

Figure 1:
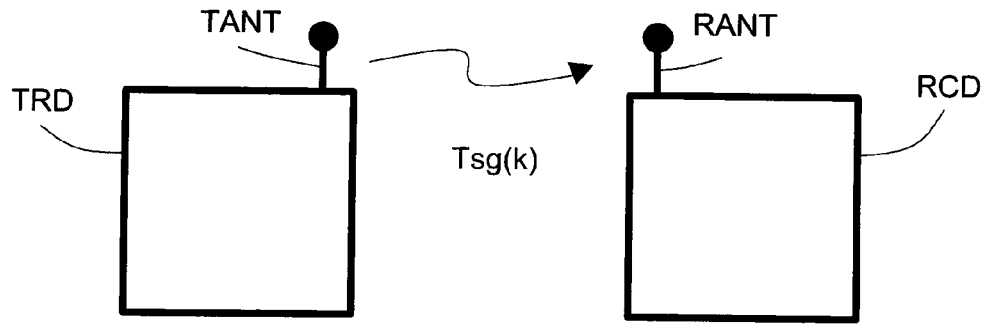

a synchronization sequence generation step (100) intended to be executed by the transmitter in the course of which the synchronization sequence ($x^i(k)$) is formed by the concatenation of a first and a second bursts of L complementary sequences, said first burst of L sequences being obtained by the concatenation of L times a first N pulses complementary sequence (A) of a pair of complementary sequences ((A,B)), said second burst of L sequences being obtained by the concatenation of L times a second N pulses complementary sequence (B) of said pair of complementary sequences, and a sequence weighting step (200) intended to be executed by the transmitter in the course of which the pulses of each complementary sequence (A) of rank q of the first burst of L sequences are multiplied by the component of rank q of a L components long weighting code ($MC^i$) belonging to a set of I weighting codes known by the receiver (RCD) beforehand, and the pulses of each sequence of rank q of the second burst of L sequences are multiplied by the same component of rank q of said weighting code ($MC^i$).

38 Claims, 8 Drawing Sheets

METHOD FOR SYNCHRONISING A SIGNAL FRAME OF A SIGNAL TRANSMITTED FROM A TRANSMITTER TO A RECEIVER OF A TELECOMMUNICATION SYSTEM

The present invention relates to a method for synchronising at a receiver end a signal frame transmitted by a transmitter in a telecommunication system by transmission of a synchronisation sequence of pulses included into said signal frame. It relates also to said synchronisation sequence and according to its hardware-oriented aspects to said system, and both to a transmitter and a receiver of said system.

The transmitter is either a base station, a mobile telecommunication device or any other telecommunication apparatus adapted to form and to transmit said signal frame to a receiver of the telecommunication system.

The receiver is either a base station, a mobile telecommunication device or any other telecommunication apparatus adapted to synchronise a signal frame when it is received.

Synchronising a signal frame stands for synchronising in time and sometimes in frequency such a signal frame.

Synchronising in frequency a signal frame means that the possible phase rotation of the received signal due to a frequency drift is corrected when it has a significant impact on the system performance, i.e. when low-cost frequency oscillators are included in the receiver and/or the transmitter. This refers in the following to the coarse frequency synchronisation of the signal frame. The coarse frequency synchronisation of the signal frame may not be sufficient and a residual phase rotation may remain after the received signal has been corrected by the coarse frequency synchronisation. The coarse frequency synchronisation of the signal frame may also be non-adapted to correct a low phase rotation. Thus, synchronising in frequency a signal frame means also that such a residual (or low) phase rotation is corrected. This refers in the following to the fine frequency synchronisation of the signal frame.

Synchronising in time a signal frame is usually reached by including in the signal a synchronisation sequence which carries information from which the receiver is able to get a timing reference. The receiver, which is not aware if the received signal carries such a synchronisation sequence, and does not know when the synchronisation sequence has been included in the signal frame, is scanning pulse per pulse the received signal continuously and gets the timing reference of a received signal frame when the received signal includes such a synchronisation sequence.

The present invention aims at solving such a synchronisation problem.

The synchronization in time of a signal frame is based, according to the present invention, on the perfect aperiodic autocorrelation property of a pair of complementary sequences (A,B).

A complementary sequence A is a N bits long sequence $\{a_0, a_1, \ldots, a_{N-1}\}$ such that $a_i \in \{+1,-1\}$ and a complementary sequence B is also a N bits long sequence $\{b_0, b_1, \ldots, b_{N-1}\}$ such that $b_i \in \{+1,-1\}$. The perfect aperiodic auto-correlation property of the pair of complementary sequences (A,B) is then defined by $$\begin{cases} \rho_{A,A}(k) = -\rho_{B,B}(k) & \forall k \neq 0 \\ \rho_{A,A}(0) = \rho_{B,B}(0) \end{cases} \quad (1)$$

where $\rho_{A,A}(k) \forall k$ and $\rho_{B,B}(k) \forall k$ are the aperiodic auto-correlation of the sequence A and B respectively defined by $$\begin{cases} \rho_{A,A}(k) = \sum_{i=0}^{N-k-1} a_i^* + a_{i+k} & 0 \leq k \leq N-1 \\ \rho_{B,B}(k) = \sum_{i=0}^{N-k-1} b_i^* b_{i+k} \end{cases}$$

By summing out the aperiodic auto-correlations $\rho_{A,A}(k) \forall k$ and $\rho_{B,B}(k) \forall k$ of sequences A and B, a single peak appears which is related to the sum of aperiodic auto-correlations $\rho_{A,A}(k=0)$ and $\rho_{B,B}(k=0)$. The sums of other aperiodic auto-correlations $\rho_{A,A}(k) \forall k \neq 0$ and $\rho_{B,B}(k) \forall k \neq 0$ are all null. Detecting said single peak leads to a precise synchronisation in time of a signal frame, i.e. the receiver is then able to define the beginning of the signal frame which is being received.

Note that equation (1) provides the definition of a pair of bi-polar complementary sequences which is used in the following, but because such a definition may be generalised easily to non-binary sequences, the scope of the present invention is not limited to bi-polar complementary sequences.

Golay sequences, defined for example in the book "Golay Complementary Sequences" (M.G. Parker et al., June 2004 M.G.Parker, K.G.Paterson and C. Tellambura, Wiley Encyclopedia of Telecommunications, Editor: J.G. roakis, Wiley Interscience, 2002), are an example of such a pair of complementary sequences.

Indeed, the present invention aims at providing a method for synchronising a signal frame transmitted by a transmitter of a telecommunication system to a receiver adapted to synchronise said signal frame from a synchronisation sequence included in said signal frame, characterised in that it includes a synchronisation sequence generation step intended to be executed by the transmitter in the course of which the synchronisation sequence is formed by the concatenation of a first and a second bursts of L complementary sequences, said first burst of L sequences being obtained by the concatenation of L times a first N pulses complementary sequence of a pair of complementary sequences, said second burst of L sequences being obtained by the concatenation of L times a second N pulses complementary sequence of said pair of complementary sequences.

The method for synchronising further includes a sequence weighting step intended to be executed by the transmitter in the course of which the pulses of each complementary sequence of rank q of the first burst of L sequences are multiplied by the component of rank q of a L components long weighting code belonging to a set of I weighting codes known by the receiver beforehand, and the pulses of each sequence of rank q of the second burst of L sequences are multiplied by the same component of rank q of said weighting code.

An advantage of the present invention is that each L long components weighting code may be representative of any information which shall be transmitted from the transmitter to the receiver. For example, when such a synchronisation method is included in a cellular telecommunication system, the weighting code may be representative of a cell or cell sector characteristic, such as an identifier, or an information which allows to get such a cell or cell sector characteristic.

According to an aspect of the present invention, in the course of the synchronisation sequence generation step at least one guard interval, defined by a W bits long cyclic extension of either the first or second complementary sequence is included in the synchronisation sequence. Said at least one guard interval is located either at the beginning or at the end of the first burst of L sequences when said at least one guard interval is defined from the first complementary sequence, and said at least one guard interval is located either at the beginning or at the end of the second burst of L sequences when said at least one guard interval is defined from the second complementary sequence.

According to an embodiment of the synchronisation sequence generation step, two guard intervals are defined by W bits long cyclic extensions of the first complementary sequence. One of said guard interval is located at the beginning of the first burst of L sequences and the other one is located at the end of the first burst of L sequences. Moreover, two guard intervals are defined by W bits long cyclic extensions of the second complementary sequence. One of said guard interval is located at the beginning of the second burst of L sequences and the other one is located at the end of the second burst of L sequences.

In the following the receiver is considered as being equipped by at least one antenna intended each to receive said signal frame.

According to an embodiment of the present invention, the set of I weighting codes is a set of orthogonal codes from which a fast transform is obtained. Each weighting code is a Hadamard code according to a first example and a Hadamard fast transform is obtained. According to an other example each weighting code is a Fourier code and a fast Fourier transform is obtained.

Using orthogonal codes ensures orthogonality between information carried by such modulation codes. This property is particularly interesting in the case of a cellular telecommunication system when the weighting codes are representative of cell or sector identifiers because it ensures orthogonality between neighboring cells or cell sectors.

According to a variant of this embodiment, the weighting codes are multiplied by a same scrambling code which is, for example, a Barker code.

According to another aspect of the present invention, the method for synchronising is characterised in that it further includes for each of said at least one antenna, a resulting stream computation step in the course of which at least one resulting stream is obtained from the signal which is being received by the antenna, said resulting stream computation step includes at least one time-shifting sub-step in the course of each a time-delayed version of the received signal is computed, at least one first sequence correlation sub-step in the course of each a first correlation stream is computed by correlating the time-delayed version of the received signal with a replica of the first complementary sequence of the pair of complementary sequences, at least one second sequence correlation sub-step in the course of each a second correlation stream is computed by correlating the received signal with a replica of the second complementary sequence of the pair of complementary sequences, and at least one stream summation sub-step in the course of each a resulting stream is formed from the first correlation stream and the second correlation stream.

Moreover, the method for synchronising includes also an output stream computation step in the course of which at least one output stream is obtained for each of said at least one resulting stream and a time instant determination and weighting code retrieval step in the course of which at least one decision value at a time instant is computed from said at least one output stream. A time instant, at which the signal frame which is being received is said synchronised in time, is then obtained by maximising said at least one decision value, and the weighting code carried by the received synchronisation sequence is retrieved from L peaks separated by N positions from each other of at least one of said resulting streams obtained from said maximum decision value. The first of said L peaks of each of said at least one resulting stream is located at the time instant at which the signal frame is said synchronised in time.

A resulting stream which carries a single peak from which a signal frame is synchronised in time exhibits possibly secondary peaks which are due to bad autocorrelation properties of weighting codes. This drastically increases the detection error probability. In order to counter fight this problem, it is advantageous that a scrambling code is used in order to bound the norms of said secondary peaks.

According to a first embodiment of the resulting stream computation step related to an antenna, the resulting stream computation step includes a single time-shifting sub-step in the course of which a time-delayed version of the received signal is computed, a single first sequence correlation sub-step in the course of which a first correlation stream is computed by correlating the time-delayed version of the received signal with a replica of the first complementary sequence of the pair of complementary sequences, a single second sequence correlation sub-step in the course of which a second correlation stream is computed by correlating the received signal with a replica of the second complementary sequence of the pair of complementary sequences, and a single stream summation sub-step in the course of which a resulting stream is formed by summing said first correlation stream and said second correlation stream.

According to a second embodiment of the resulting stream computation step related to an antenna, M frequency offset values being predefined by the receiver from a range of possible frequency drifts, the resulting stream computation step includes a single time-shifting sub-step in the course of which a time-delayed version of the received signal is computed, a single first sequence correlation sub-step in the course of which a first correlation stream is computed by correlating the time-delayed version of the received signal with a replica of the first complementary sequence of the pair of complementary sequences, a single second sequence correlation sub-step in the course of which a second correlation stream is computed by correlating the received signal with a replica of the second complementary sequence of the pair of complementary sequences, M coarse sequence by sequence frequency correction sub-steps in the course of each the phase of pulses of said second correlation stream related to a same complementary sequence is corrected by a constant value related to one of said M frequency offset values, and M stream summation sub-steps in the course of each a resulting stream is formed by summing the first correlation stream and one of said M corrected second correlation streams.

This embodiment is advantageous because the application of the coarse frequency correction on the second correlation stream rather than on the full received signal provides a lower complexity receiver.

According to a third embodiment of the resulting stream computation step related to an antenna, M frequency offset values being predefined by the receiver from a range of possible frequency drifts, the resulting stream computation step includes M coarse pulse by pulse frequency correction sub-steps in the course of each the phase of each pulse of the received signal is corrected by a linearly increasing value the slope of which is related to one of said M frequency offset values, M time-shifting sub-steps in the course of each a time-delayed version of one of said M received and phase corrected signals is computed, M first sequence correlation sub-steps in the course of each a first correlation stream is computed by correlating the time-delayed version of one of said M received and phase corrected signals with a replica of the first complementary sequence A of the pair of complementary sequences, M second sequence correlation sub-steps in the course of each a second correlation stream is computed by correlating one of said M received and phase corrected signals with a replica of the second complementary sequence of the pair of complementary sequences, and M stream summation sub-steps in the course of each a resulting stream is formed from one of said M first correlation streams and one of said M second correlation streams related to the same received and phase corrected signal.

According to a first embodiment of the time instant determination and weighting code retrieval step, at a time instant, a decision value is computed for each of said at least one output stream obtained from each of said at least one antenna.

According to a second embodiment of the time instant determination and weighting code retrieval step, at a time instant, a decision value is computed for at least one combination of said at least one output stream. Each of said at least one combination, which is related to either one of said I weighting codes or one of said M frequency offsets and one of said I weighting codes, is defined by the square root of the sum of squared modules of output streams obtained from said at least one antenna which are related to either a same weighting code or the same weighting code and the same frequency value.

According to a first embodiment of the computation of a decision value, each decision value computed at a time instant related to an output stream, respectively a combination of output streams, is the squared norm of said output stream, respectively the combined output stream, evaluated at said time instant.

According to second embodiment of the computation of a decision value, each decision value computed at a time instant related to an output stream, respectively a combination of output streams, is a correlation merit factor defined by the ratio of the energy at said time instant of said output stream, respectively said combination of output streams, divided by the energy of said output stream, respectively said combination of output streams, averaged on two time intervals defined respectively before and after said time instant.

According to a first embodiment of the output stream computation step, I output streams are obtained for each of said at least one resulting stream, each of said I output streams related to one of said at least one resulting stream is obtained by correlating, at a given time instant, said resulting stream with a comb of pulses related to one of said I weighting codes. Each pulse of a comb related to a weighting code is separated to each other by N positions. Moreover, each pulse of said comb is weighted by a component of said weighting code.

According to a second embodiment of the output stream computation step, the I weighting codes being orthogonal to each other, a fast transform related to said orthogonal weighting codes being obtained, I output streams are obtained for each of said at least one resulting stream, each of said I output streams related to each of said at least one resulting stream is obtained by processing L pulses of said resulting stream separated to each other by N positions with said fast transform.

According to a third embodiment of the output stream computation step, a single output stream is obtained for each of said at least one resulting stream by computing, at a time instant, the squared root of the sum of the energy of L pulses separated by N positions from each other of said resulting stream.

This embodiment is advantageous because it provides a lower complexity receiver compared to the complexity of the receiver defined according to previous embodiments. Such a low complexity receiver is due to the fact that the location of the synchronisation sequence power is looking for rather than performing multiple correlations as above-described in previous embodiments.

When the output streams are obtained from the third embodiment of the output stream computation step, each of (L−1) components following the first component of each of said I weighting codes being differentially encoded from its first component, the signal frame being possibly corrected in frequency, L peaks separated by N positions from each other of a single resulting stream obtained from said maximal decision value and related to each of said at least one antenna being considered, the first of said L peaks being located at the time instant at which the signal frame is synchronised, in the course of the time instant determination and weighting code retrieval a soft estimate of a component of rank q of the weighting code carried by the received signal frame is obtained from the product of the sum of the phase rotation and amplitude corrected peak of rank q of said at least one single resulting stream by a weighting value.

According to a first embodiment of the phase rotation and amplitude peak correction, the phase rotation and amplitude of said at least one peak of rank q are corrected by multiplying said peak of rank q by the complex conjugate of the peak preceding said (L−1) peaks, and said weighting value is the square root of the sum of the square of the module of peaks preceding the (L−1) peaks of each of said at least one single resulting stream.

According to a second embodiment of the phase rotation and amplitude peak correction, the phase rotation and amplitude of said at least one peak of rank q are corrected by multiplying said at least one peak of rank q by the product of the complex conjugate of the peak preceding said (L−1) peaks divided by its module by the square root of the average energy of said L peaks, and said weighting value is the square root of the sum of the average energies of said L peaks obtained for each of said at least one single resulting stream.

According to another aspect of the present invention, the signal frame received by each of said at least one antenna being transmitted on a multipath channel having P consecutive paths and being synchronised in time and possibly coarsely corrected in frequency, in the course of the time instant determination and weighting code retrieval step the phase of each pulse of a received signal frame is corrected by a linearly increasing value the slope of which is obtained from a weighted average of at least P slope estimations obtained for each of said at least one antenna. Each of said P slope estimations is weighted by an estimate of the squared amplitude of one of said P path coefficients, and the weighting value of said average is the sum of the squared amplitude of said P path coefficients.

According to an embodiment for computing a slope estimation, each slope estimation related to a path coefficient is obtained by the ratio of a sequence by sequence slope estimation related to said path coefficient over N, said sequence by sequence slope estimation being defined by the average of (L−1) differences between the phase of the sum of a first and a second correlation factor related to said path coefficient and computed at a first time instant on a segment of respectively a first and second complementary sequence of the received synchronisation sequence and the phase of the sum of a first and a second correlation factor related to said path coefficient and computed at a second time instant on a segment of respectively a first and second complementary sequence of the received synchronisation sequence.

According to another aspect of the present invention, the signal is transmitted from multiple antennas. The method for synchronising according to the present invention is then characterised in that the transmitter transmits the same signal from each of said antennas with minor different time delays.

According to one of its hardware oriented aspects, the present invention relates to a transmitter intended to execute the above-mentioned synchronisation sequence generation and sequence weighting steps.

According to another of its oriented aspects, the present invention relates to a receiver intended to execute the above-mentioned resulting stream computation step for each of its antennas, and the above-mentioned output stream computation step and the above-mentioned time instant determination and weighting code retrieval step.

Figure 2:
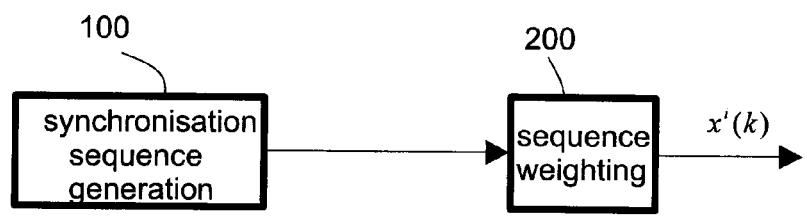
Figure 3:
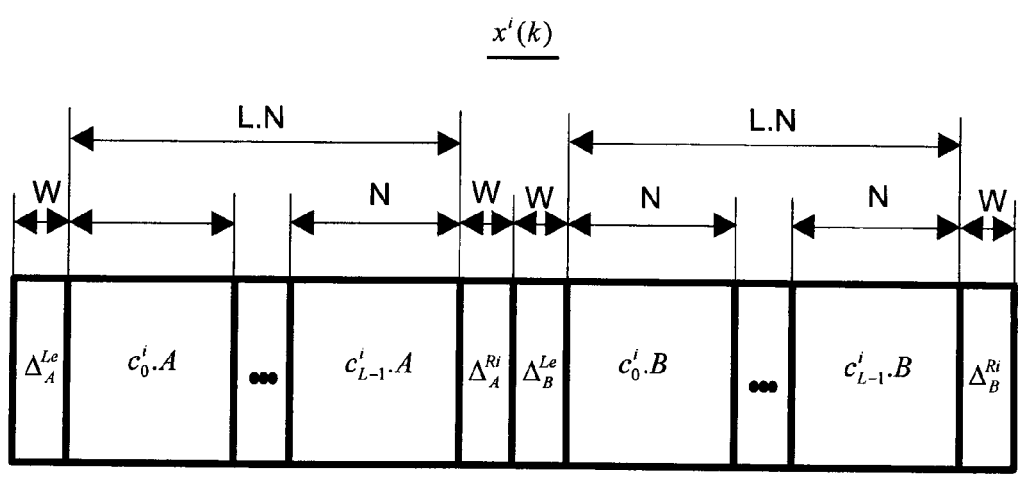
Figure 4:
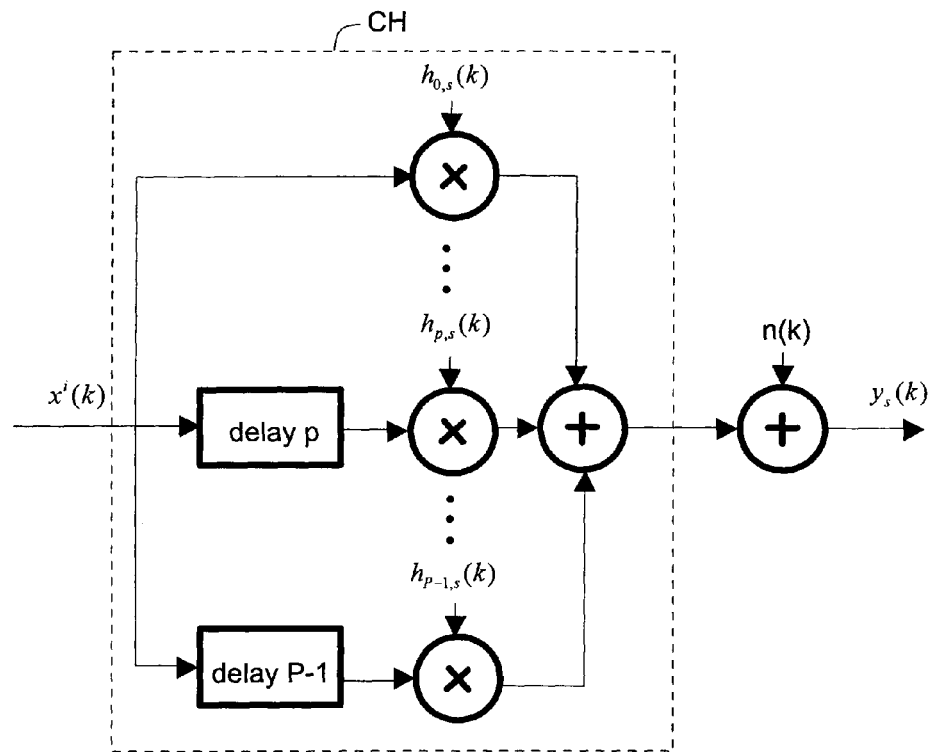
Figure 5:
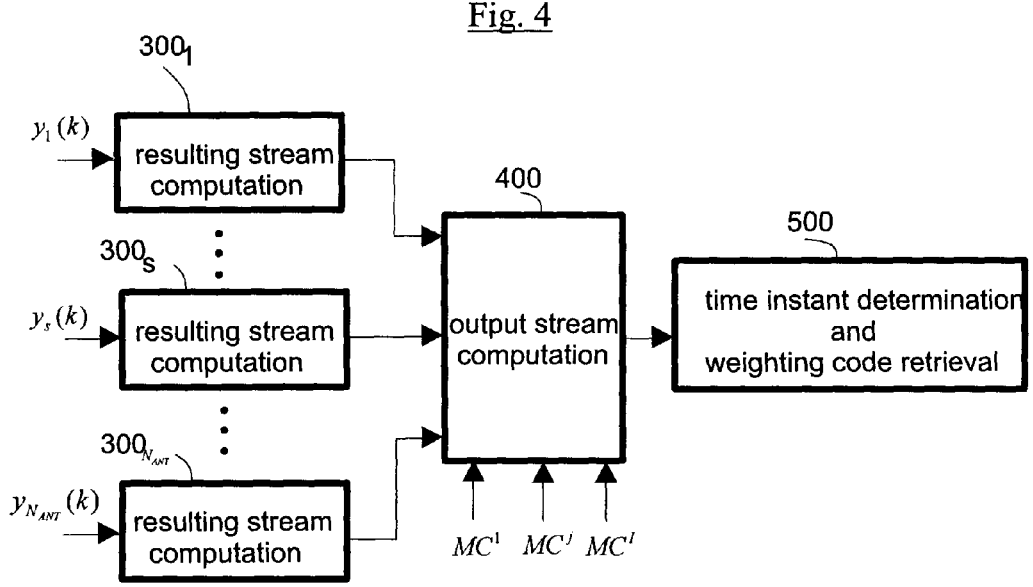
Figure 6:
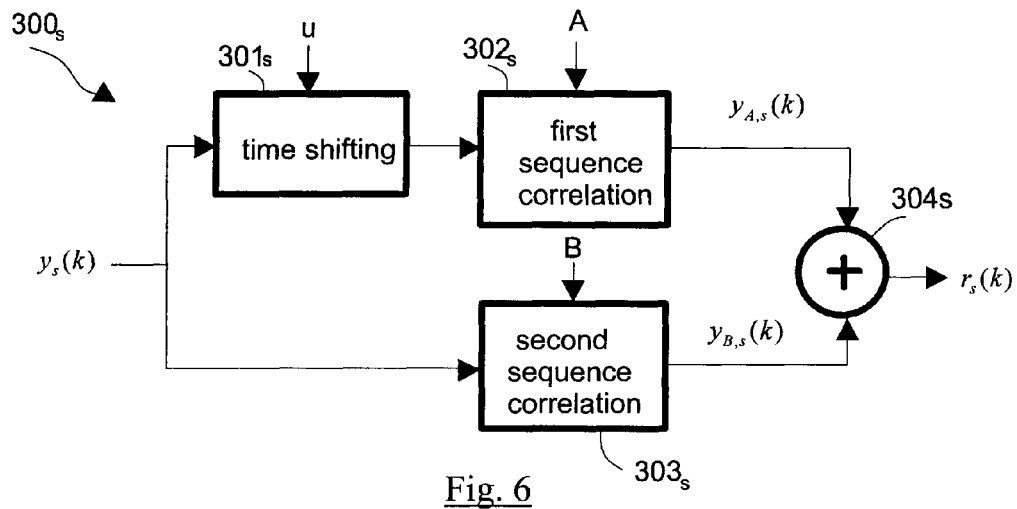
Figure 7:
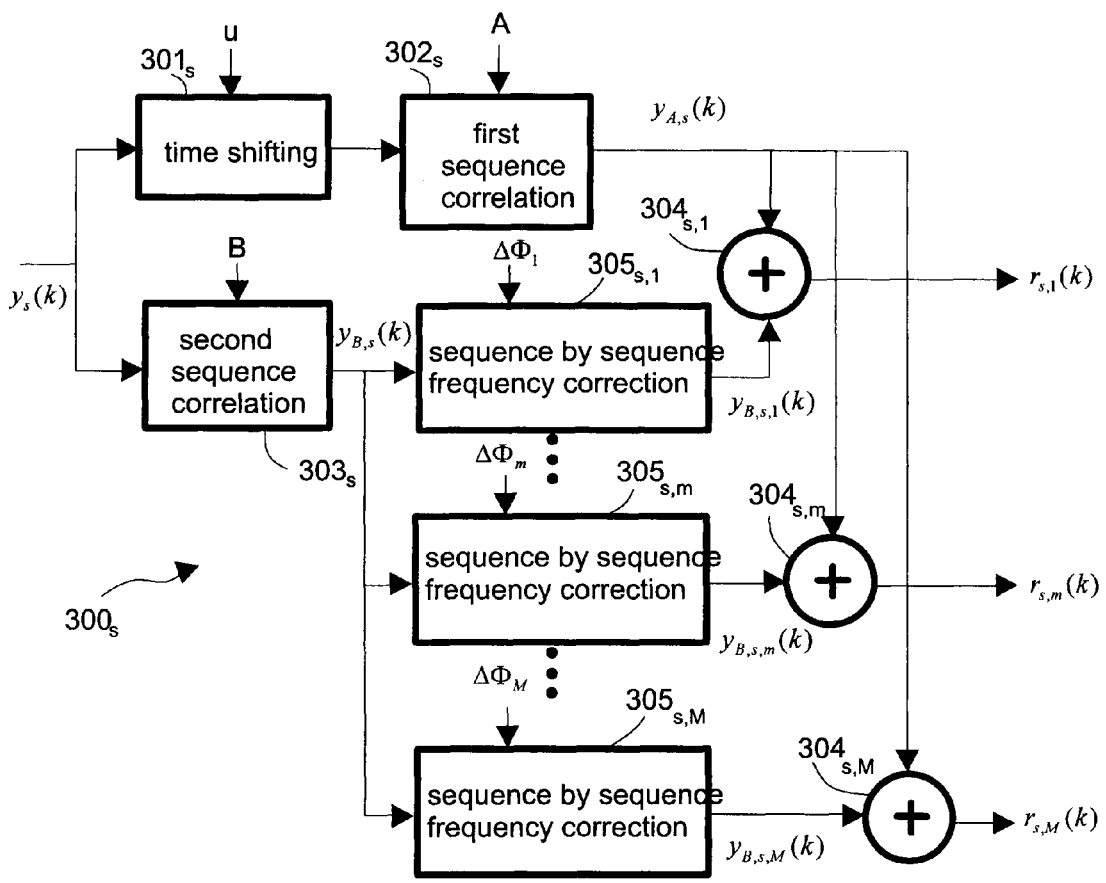
Figure 8:
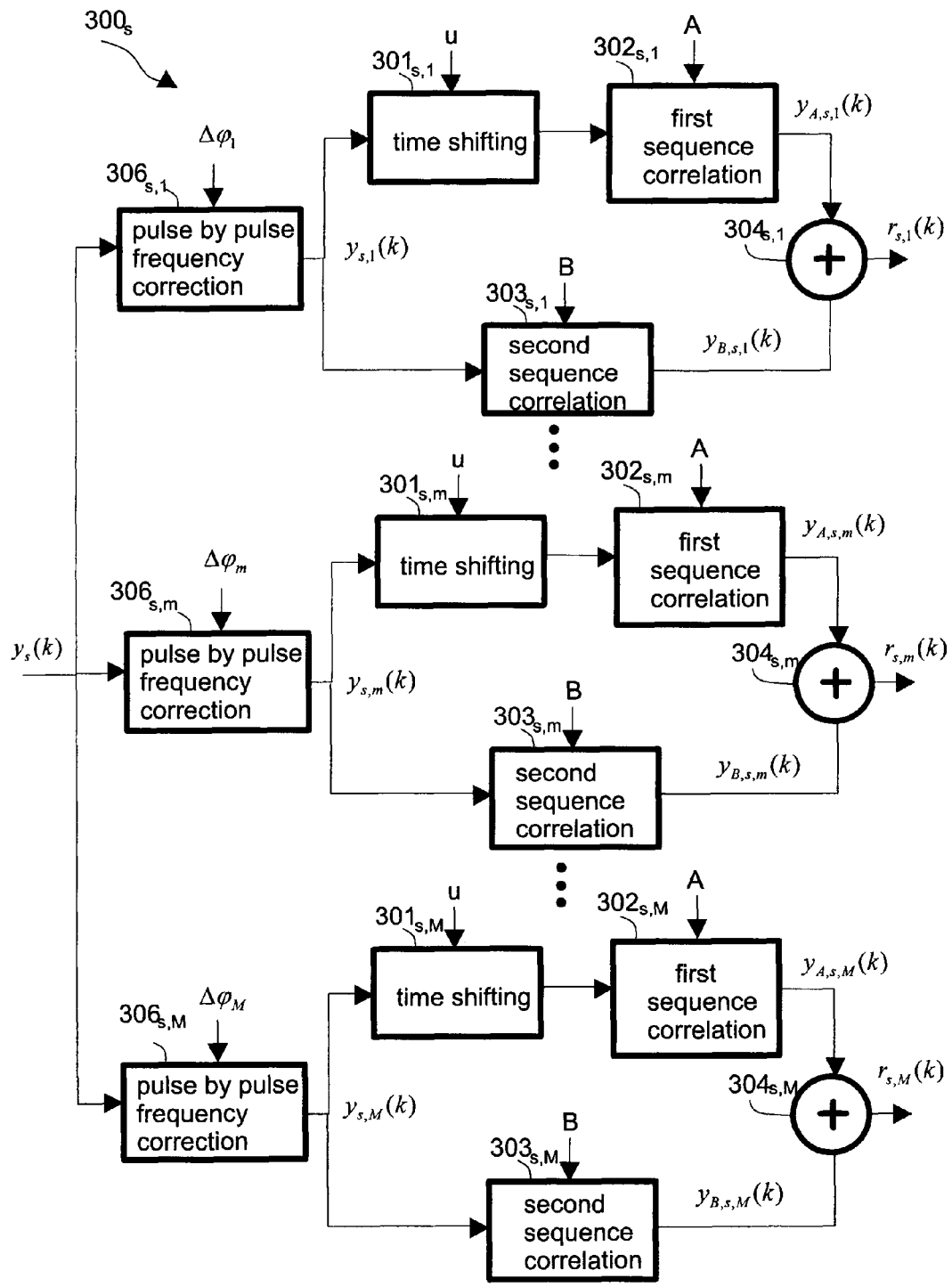
Figure 9:
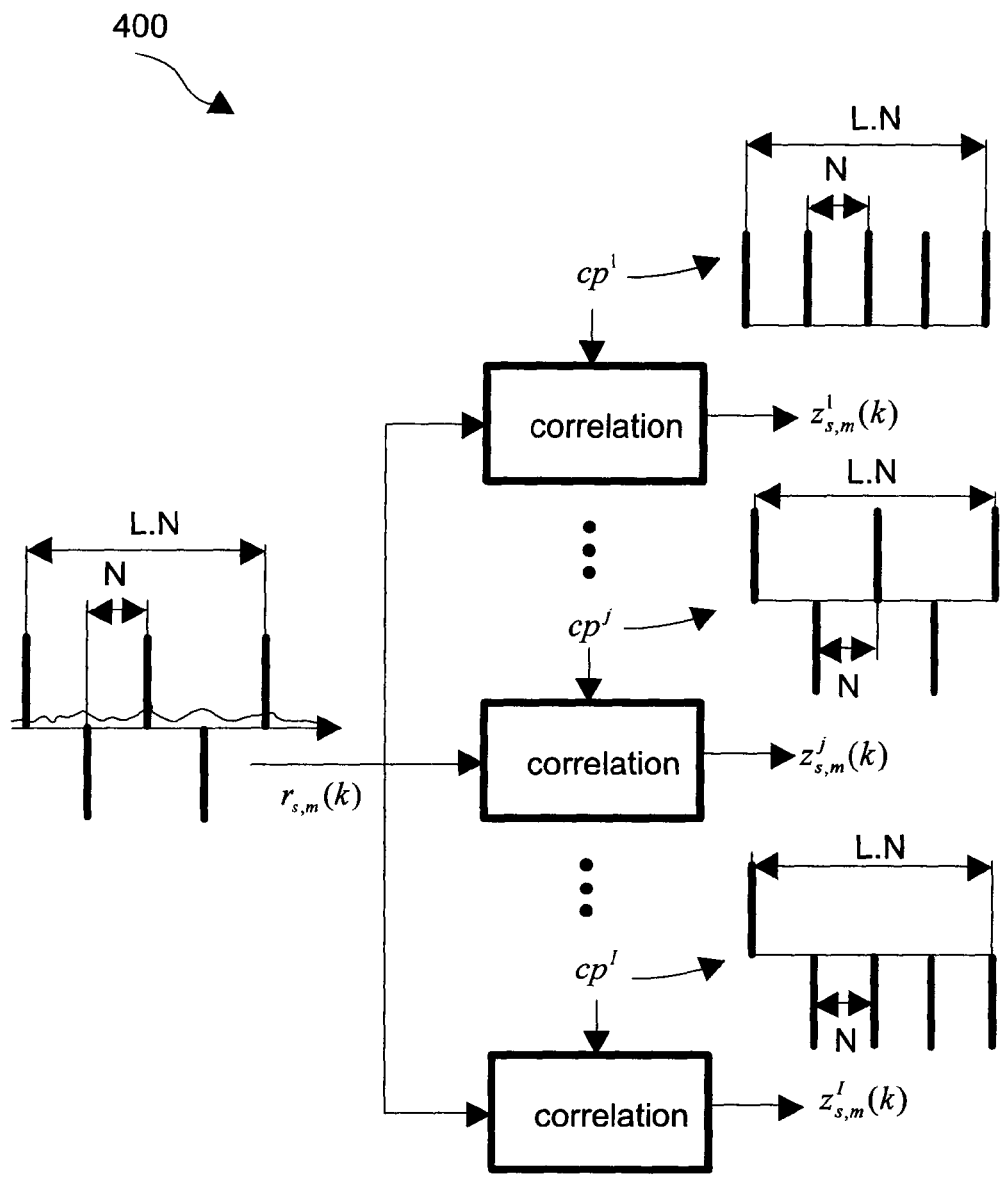
Figure 10:
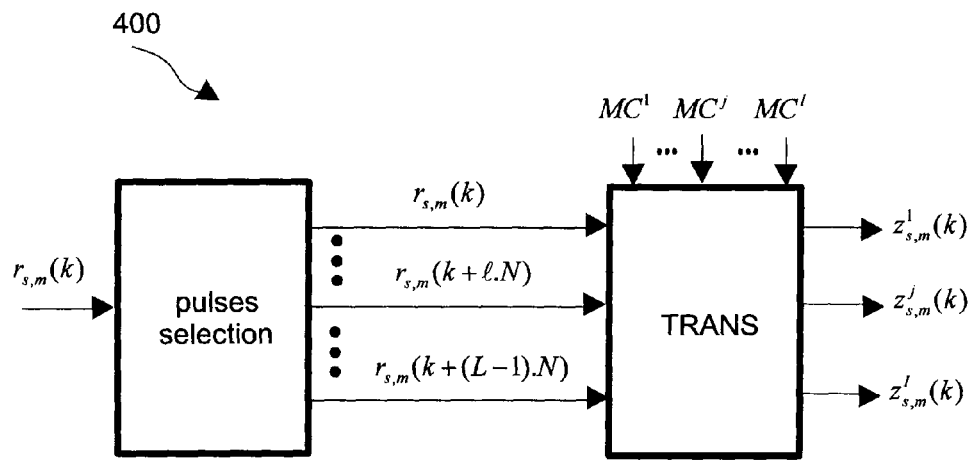
Figure 11:
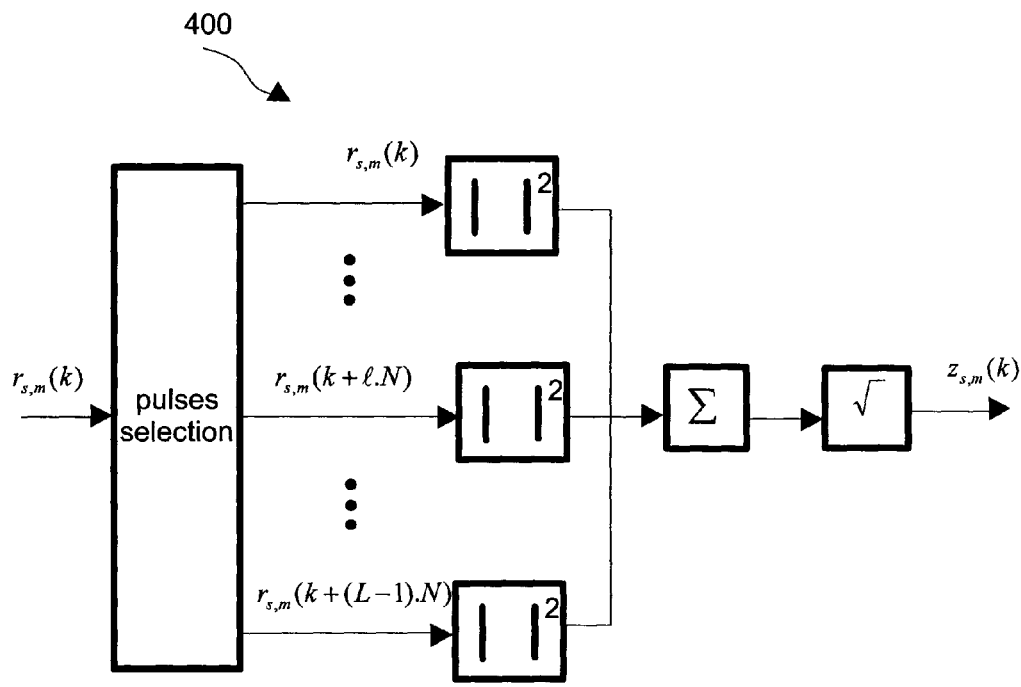
Figure 12:
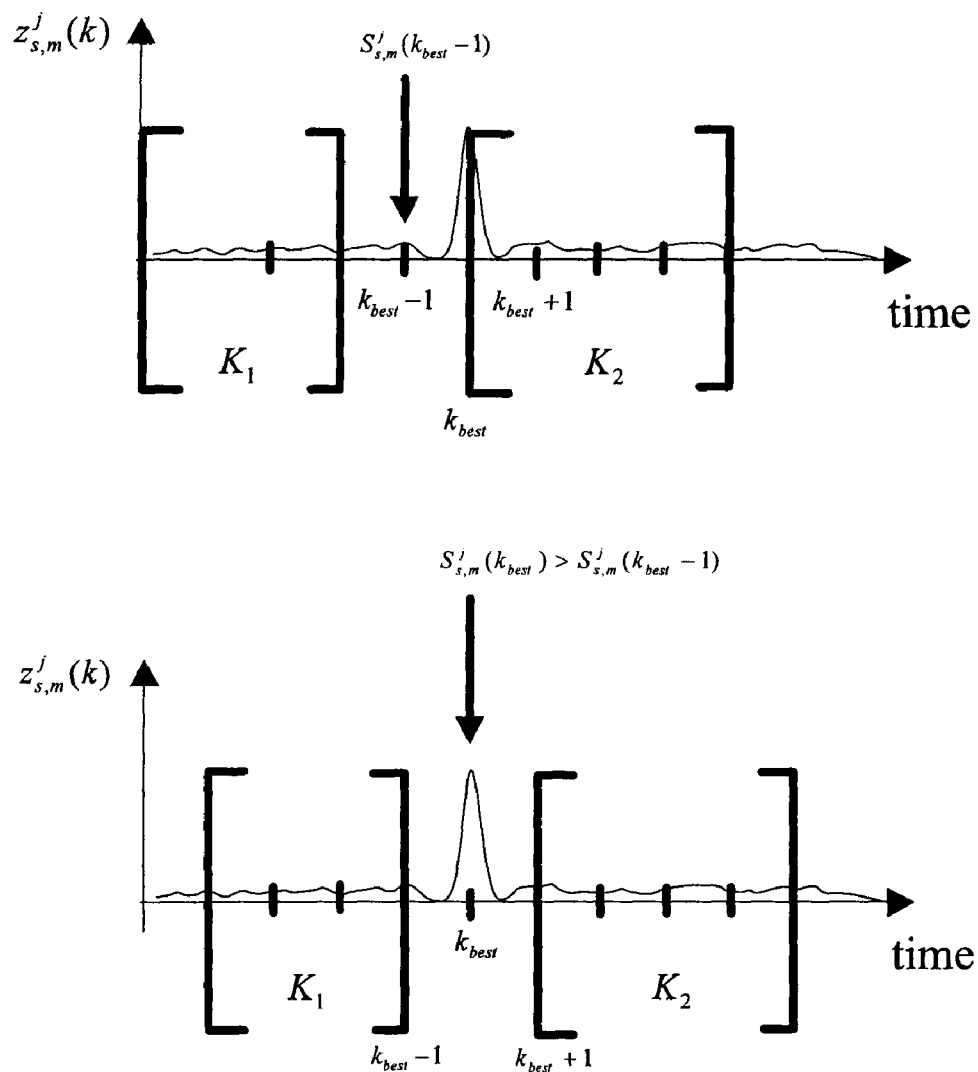
Figure 13:
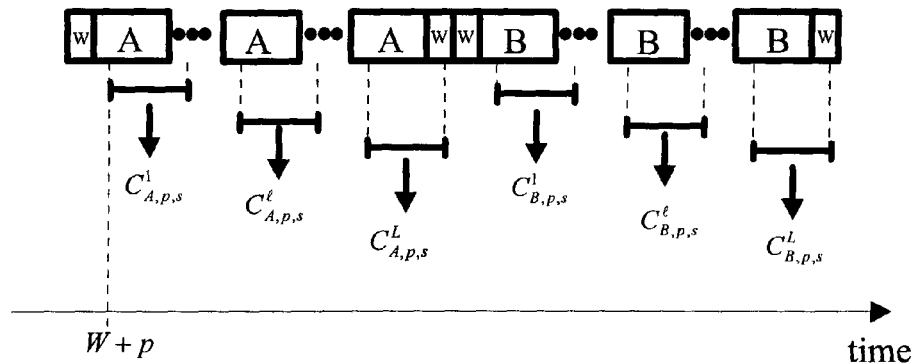
Figure 14:
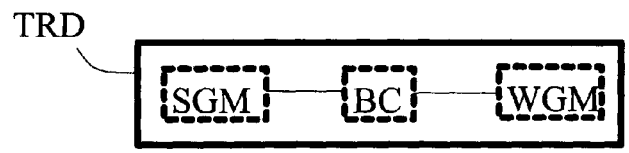
Figure 15:
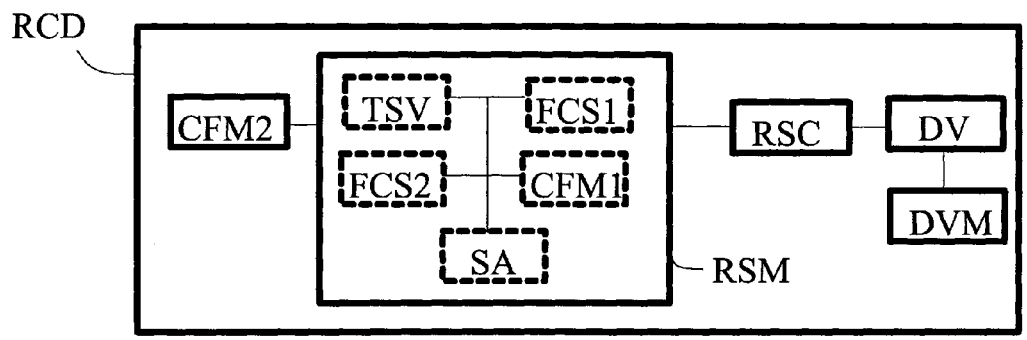
Figure 16A:
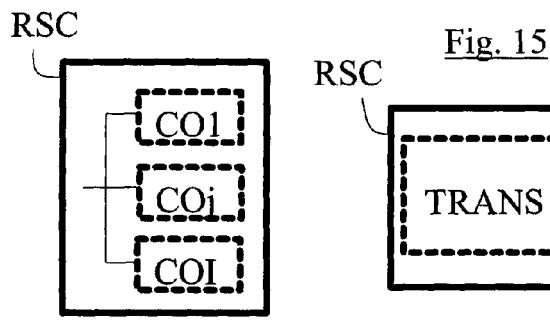
Figure 16B:
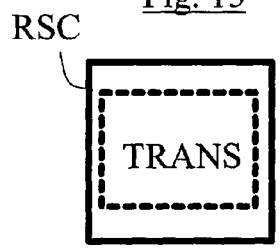
Figure 16C:
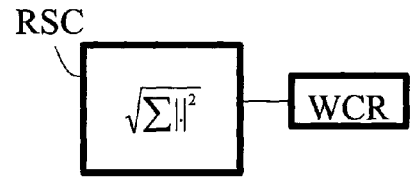

The characteristics of the invention mentioned above, as well as others, will emerge more clearly from a reading of the following description given in relation to the accompanying figures, amongst which:

FIG. 1 represents a synoptic schema of an example of telecommunication system according to the present invention, FIG. 2 is a diagram which represents the steps of a method for synchronising a signal frame of a received signal intended to be executed by the transmitter according to the present invention, FIG. 3 represents an example of a synchronisation sequence according to the present invention, FIG. 4 depicts the transmission of a synchronisation sequence on a multipath transmission channel, FIG. 5 represents a diagram which represents the steps of a method for synchronising a signal frame of a received signal intended to be executed by the receiver according to the present invention, FIG. 6 represents a diagram of a first embodiment of the resulting stream computation step, FIG. 7 represents a diagram of a second embodiment of the resulting stream computation step, FIG. 8 represents a diagram of a third embodiment of the resulting stream computation step, FIG. 9 represents a diagram of a first embodiment of the output stream computation step, FIG. 10 represents a diagram of a second embodiment of the output stream computation step, FIG. 11 represents a diagram of a third embodiment of the output stream computation step, FIG. 12 represents a chronogram which depicts the computation of a decision value, FIG. 13 depicts how correlation factors are computed, FIG. 14 represents a schema of a transmitter according to the present invention, FIG. 15 represents a schema of a receiver according to the present invention, and FIG. 16a to 16c depicts different embodiments of the resulting stream combiner includes in the receiver.

FIG. 1 represents a synoptic schema of an example of a telecommunication system SYST according to the present invention. A radio telecommunication is depicted in FIG. 1 but the present invention is not restricted to such telecommunication systems. The telecommunication system SYST includes a receiver RCD which is intended to receive continuously a signal from $N_{ant}$ antennas $RANT_s$ and other communications means not depicted. When such a received signal is a signal Tsg(k) which is generated and transmitted by the transmitter TRD of the telecommunication system SYST, from the antenna TANT (and other communication means not depicted) to the receiver RCD, each signal frame of the signal Tsg(k) is being synchronised at the receiver end.

FIG. 2 is a diagram which represents the steps of a method for synchronising a signal frame of the received signal Tsg(k) intended to be executed by the transmitter TRD according to the present invention.

The synchronisation method includes a synchronisation sequence generation step 100 and a sequence weighting step 200. In the course of the synchronisation sequence generation step 100 a synchronisation sequence $x^i(k)$ is embedded in each signal frame of the signal Tsg(k). The synchronisation sequence $x^i(k)$ is generated from a pair of complementary sequences (A,B) defined in the opening paragraph. In the course of the sequence weighting step 200, the generated synchronisation sequence $x^i(k)$ is weighted by a weighting code $MC^i = \{c_0^i, \ldots, c_1^i, \ldots, c_{L-1}^i\}$ which belongs to a set of I weighting codes $MC^i, i \in \{1, \ldots, I\}$ known by the receiver beforehand.

In the course of the synchronisation sequence generation step 100, a synchronisation sequence $x^i(k)$ is formed by the concatenation of a first and a second bursts of L complementary sequences. The first burst of L sequences includes L times a first complementary sequence A of the pair of complementary sequences (A,B), and the second burst of L sequences includes L times the second complementary sequence B of the pair of complementary sequences (A,B). The first and second bursts of L sequences include then each L.N pulses.

In the course of the sequence weighting step 200, the pulses of each complementary sequence A of rank q of the first burst of L sequences are multiplied by the component of rank q of a L components weighting code $MC^i = \{c_0^i, \ldots, c_1^i, \ldots, c_{L-1}^i\}$, and the pulses of each complementary sequence B of rank q of the second burst of L sequences are multiplied by the same component of rank q of said weighting code.

According to an aspect of the present invention, in the course of the synchronisation sequence generation step 100, at least one guard interval, defined by a W bits long cyclic extension of either the first or second complementary sequence is included in the synchronisation sequence $x^i(k)$. Said at least one guard interval is located either at the beginning or at the end of the first burst of L sequences when said at least one guard interval is defined from the first complementary sequence A, and said at least one guard interval is located either at the beginning or at the end of the second burst of L sequences when said at least one guard interval is defined from the second complementary sequence B.

According to an embodiment of the synchronisation sequence generation step 100, four guard periods $\Delta_A^{Le}, \Delta_A^{Ri}, \Delta_B^{Le}$ and $\Delta_B^{Ri}$ are defined. The index 'Le' and 'Ri' means that the cyclic extension is located respectively at the beginning and the end of a burst of L sequences. More precisely, the cyclic extension $\Delta_A^{Le}$, which is obtained from a W long cyclic extension of the complementary sequence A, is included at the beginning of the first burst of L sequences, the cyclic extension $\Delta_A^{Ri}$, which is also obtained from a W long cyclic extension of the complementary sequence A, is included at the end of the first burst of L sequences, the cyclic extension $\Delta_B^{Le}$, which is obtained from a W long cyclic extension of the complementary sequence B, is included at the beginning of the second burst of L sequences, and the cyclic extension $\Delta_B^{Ri}$, which is also obtained from a W long cyclic extension of the complementary sequence B, is included at the end of the second burst of L sequences. FIG. 3 shows an example of such a synchronisation sequence $x^i(k)$.

The synchronisation sequence $x^i(k)$ at the transmitter output is thus given by the general equation (2) in which the cyclic extension value W may be null if the bursts of L sequences are not combined with guard intervals:

$$x^i(k) = \Delta_A^{Le}(k) + \sum_{l=0}^{L-1} c_l^i \cdot A[k - W - l \cdot N] + \Delta_A^{Ri}(k - W - N \cdot L) + \quad (2)$$

$$\Delta_B^{Le}(k - u) + \sum_{l=0}^{L-1} c_l^i \cdot B[k - W - l \cdot N - u] + \Delta_B^{Ri}(k - W - N \cdot L - u)$$

with $u = N \cdot L + 2 \cdot W$ and $A[k] = B[k] = 0$ for $k < 0$ and $k \geq N$.

In the telecommunication system SYST, the signal Tsg(k) flows between the transmitter TRD and the receiver RCD on a multipath transmission channel CH. In the case of a radio telecommunication system for example, the transmission channel CH is called multipath because between the transmitter TRD and the receiver RCD there are usually obstacles on which waves are reflected. Then, a transmitted signal Tsg(k) is propagating along several paths between the transmitter TRD and the receiver RCD.

FIG. 4 depicts the transmission of the synchronisation sequence $x^i(k)$ to an antenna $RANT_s$ on a multipath transmission channel CH having P consecutive paths. The model of such a channel CH is then a P branches model. The synchronisation sequence $X^i(k)$ is thus transmitted on each of P branches by first delaying it by p pulses and multiplying it by a complex path coefficient $h_{p,s}$. Next, due to some imperfection of the telecommunications means of the receiver RCD, a random signal n(k) which is usually modeled by a white Gaussian noise, is added to the sum of P terms $X^i(k-p) \cdot h_{p,s}(k)$.

Consequently, the synchronisation sequence $y_s(k)$ which is possibly carried by a signal received by one of antennas $RANT_s$ of the receiver RCD is given by:

$$y_s(k) = \left[ \sum_{p=0}^{P-1} x^i(k - p) \cdot h_{p,s}(k) \right] + n(k) \quad (3)$$

where the index s refers to the antenna $RANT_s$.

When the signal which is being received is the signal Tsg(k), the synchronisation sequence $y_s(k)$ is given by equation (4) once equation (2) and (3) are combined:

$$y_s(k) = \quad (4)$$

$$\sum_{p=0}^{P-1} \begin{bmatrix} \Delta_A^{Le}(k - p) + \sum_{l=0}^{L-1} c_l^i \cdot A[k - p - W - l \cdot N] + \\ \Delta_A^{Ri}(k - p - W - N \cdot L) + \\ \Delta_B^{Le}(k - p - u) + \sum_{l=0}^{L-1} c_l^i \cdot B[k - p - W - l \cdot N - u] + \\ \Delta_B^{Ri}(k - p - W - N \cdot L - u) \end{bmatrix} \cdot h_{p,s}(k) +$$

$$n(k)$$

FIG. 5 shows a diagram which represents the steps of the method for synchronising a signal frame of a received signal intended to be executed by the receiver RCD according to the present invention. The method for synchronising includes, a resulting stream computation step $300_s$ for each antenna $RANT_s$ of the receiver RCD, an output stream computation step 400 and a time instant determination and weighting code retrieval step 500.

In the course of each resulting stream computation step $300_s$ at least one resulting streams is obtained from the signal which is being received by the antenna $RANT_s$ and which possibly carries the synchronisation sequence $y_s(k)$.

In the course of the output stream computation step 400 at least one output stream is obtained for each of said at least one resulting stream and in the course of the time instant determination and weighting code retrieval step 500 at least one decision value at a time instant k is computed from said at least one output stream. A time instant $k_{best}$, at which the signal frame which is being received is said synchronised in time, is then obtained by maximising said at least one decision value. When the synchronisation sequence $y_s(k)$ is being received, the weighting code $MC^{jbest}$ ($j_{best} \in \{1, \ldots, I\}$) carried by said received synchronisation sequence $y_s(k)$ is retrieved from L peaks separated by N positions from each other of at least one of said resulting streams obtained from said maximum decision value. The first of said L peaks of each of said at least one resulting streams is then located at the time instant $k_{best}$.

FIG. 6 represents a diagram of a first embodiment of the resulting stream computation step $300_s$ related to an antenna $RANT_s$. The resulting stream computation step $300_s$ includes a single time-shifting sub-step $301_s$, a single first sequence correlation sub-step $302_s$, a single second sequence correlation sub-step $303_s$, and a single stream summation sub-step $304_s$.

In the course of the time-shifting sub-step $301_s$, the received signal is time-delayed by a time duration u. The time duration u is defined according to the generated synchronisation sequence $x^i(k)$ which is possibly carried by the received signal. For example, when the synchronisation sequence $x^i(k)$ is given by equation (2), the time duration u is equal to (L.N+2.W) times the duration between to consecutive pulses of the synchronisation sequence $x^i(k)$, and according to another example, it is equal to (L.N) times said duration when the synchronisation sequence $x^i(k)$ is not combined with cyclic extensions.

In the course of the first sequence correlation sub-step $302_s$, a first correlation stream $y_{A,s}(k)$ is computed by correlating the time-delayed version of the received signal with a replica of the first complementary sequence A of the pair of complementary sequences (A,B).

In the course of the second sequence correlation sub-step $303_s$, a second correlation stream $y_{B,s}(k)$ is computed by correlating the received signal with a replica of the second complementary sequence B of the pair of complementary sequences (A,B).

When the synchronisation sequence $y_s(k)$ is carried by the received signal, the first correlation stream $y_A(k)$ is given by:

$$y_{A,s}(k) = \left[\sum_{p=0}^{P-1} x^i(k-p-u) \cdot h_{p,s}(k) + n(k-u)\right] * A^*(-k) \quad (5)$$

and the second correlation stream $y_{B,s}(k)$ is given by:

$$y_{B,s}(k) = \left[\sum_{p=0}^{P-1} x^i(k-p) \cdot h_{p,s}(k) + n(k)\right] * B^*(-k) \quad (6)$$

In the course of the stream summation sub-step $304_s$, a resulting stream $r_s(k)$ is formed by summing the two correlation streams $y_{A,s}(k)$ and $y_{B,s}(k)$.

When the synchronisation sequence $y_s(k)$ is carried by the received signal, the L sequences A of the first burst of L sequences are then time aligned with the L sequences B of the second burst of L sequences. The resulting stream $r_s(k)$ is then given by $$r_s(k) = y_{A,s}(k) + y_{B,s}(k) = \sum_{p=0}^{P-1} \beta^i(k-p) \cdot h_{p,s}(k) + \alpha(k) \quad (7)$$

where $\alpha(k) = n(k-u) * A^*(k-u) + n(k) * B^*(-k)$ and $$\beta^i(k) = x^i(k-u) * A^*(-k) + x^i(k) * B^*(-k)$$
$$= \begin{bmatrix} \Delta_A^{Le}(k-u) * A^*(-k) + \\ \Delta_B^{Le}(k-u) * B^*(-k) \end{bmatrix} + \sum_{l=0}^{L-1} c_l^i \cdot 2 \cdot N \cdot \delta(k-W-l \cdot N - u) +$$
$$\begin{bmatrix} \Delta_A^{Ri}(k-W-N \cdot L - u) * A^*(-k) + \\ \Delta_B^{Ri}(k-W-N \cdot L - u) * B^*(-k) \end{bmatrix}$$

Thus, according to this embodiment, at the output of the resulting stream computation step $300_s$ a single resulting stream $r_s(k)$ is obtained for each antenna $RANT_s$.

As mentioned in the opening paragraph, the frequency drift between the transmitter TRD and the receiver RCD may have a significant impact on the system performance. The phase of the received signal shall then be corrected in order to avoid that said frequency drift decreases the probability for detecting carried data and to degrade the aperiodic auto-correlation properties of complementary sequences A and B (given by equation (1)) carried by the received signal Tsg(k). Such a degradation is due to, first, the linearly varying phase rotation from pulse to pulse inside each complementary sequence itself, which destroys said properties of each sequence with its local replica, and, second, the integration of this pulse to pulse phase rotation on the first half of the synchronisation sequence $x^i(k)$ which leads to an important phase offset between the complementary sequences of a pair. The worst case occurs when the phase offset equals $\pi$ since then the amplitude of the single peak is null and the amplitudes of aperiodic auto-correlations $\rho_{A,A}(k)$ and $\rho_{B,B}(k)$ $\forall k \neq 0$ add to each other.

The receiver RCD is not aware of the precise value of the frequency drift but it knows beforehand the range to which said frequency drift belongs. The receiver determines then M possible frequency offset values $\Delta f_m$ m={1,...,M} from said range. Note that one of possible frequency offset values $\Delta f_m$ may be equal to 0 if the receiver is not aware if a frequency drift occurs, i.e. in order to consider also the version of the synchronisation sequence without any frequency correction.

FIG. 7 represents a diagram of a second embodiment of the resulting stream computation step $300_s$ related to an antenna $RANT_s$ which provides a first way for coarsely correcting in frequency the received signal.

The resulting stream computation step $300_s$ includes a single time-shifting sub-step $301_s$ a single first sequence correlation sub-step $302_s$, and a single second sequence correlation sub-step $303_s$ in order to obtain the two correlation streams $y_{A,s}(k)$ and $y_{B,s}(k)$ as above-explained.

Moreover, the resulting stream computation step $300_s$ includes M coarse sequence by sequence frequency correction sub-steps $305_{s,m}$ and M stream summation sub-steps $304_{s,m}$.

In the course of each sequence by sequence frequency correction sub-step $305_{s,m}$ the phase of pulses of the second correlation stream $y_{B,s}(k)$ related to a same complementary sequence is corrected by a constant value given by $$\Delta\Phi_m = \Delta\phi_m(N.L + 2.W)$$

where $\Delta\phi_m = 2\pi.\Delta f_m.T_{sa}$ is the phase rotation between two consecutive pulses separated by $$T_{sa} = \frac{1}{f_{sa}}$$

with $f_{sa}$ the sampling frequency and $\Delta f_m$ a possible frequency offset value. A corrected second correlation stream $y_{B,s,m}(k)$ is then obtained.

In the course of each stream summation sub-step $304_{s,m}$, a resulting stream $r_{s,m}(k)$ is formed by summing the first correlation stream $y_{A,s}(k)$ and the corrected second correlation stream $y_{B,s,m}(k)$ Thus, according to this embodiment, at the output of the resulting stream computation step $300_s$ M resulting streams $r_{s,m}(k)$ are obtained for each antenna $RANT_s$.

FIG. 8 represents a diagram of a third embodiment of the resulting stream computation step $300_s$ related to an antenna $RANT_s$ which provides a second way for coarsely correcting in frequency the received signal.

The resulting stream computation step $300_s$ includes M branches each of which includes the same sub-steps from which a resulting stream $r_{s,m}(k)$ is obtained.

A branch m includes a coarse pulse by pulse frequency correction sub-step $306_{s,m}$ in the course of which the phase of each pulse of the received signal is corrected by a linearly increasing value the slope of which is $\Delta\phi_m$. A corrected received signal $y_{s,m}(k)$ is then obtained.

The branch m includes also a single time-shifting sub-step $301_{s,m}$, a single first sequence correlation sub-step $302_s$ and a single second sequence correlation step $303_{s,m}$ in order to obtain the two correlation streams $y_{A,s,m}(k)$ and $y_{B,s,m}(k)$ from the corrected received signal $y_{s,m}(k)$. It further includes a stream summation sub-step $304_{s,m}$ in the course of which a resulting stream $r_{s,m}(k)$ is formed by summing the first correlation stream $y_{A,s,m}(k)$ and the second correlation stream $y_{B,s,m}(k)$.

Thus, according to this embodiment, at the output of the resulting stream computation step $300_s$ M resulting streams $r_{s,m}(k)$ are obtained for each antenna $RANT_s$.

As above-explained, at the output of the resulting stream computation step $300_s$, either a single resulting stream $r_s(k)$ is obtained or M resulting streams $r_{s,m}(k)$ are obtained. In the following, a general case is considered in which M resulting streams $r_{s,m}(k)$ are obtained. Simpler cases can be deduced from such a general case. For example, a single resulting stream $r_s(k)$ is obtained from this general case when M=1. Moreover, when no coarse frequency correction is required, a single resulting stream is obtained for $\Delta f_m = 0$ and M=1.

FIG. 9 represents a diagram of a first embodiment of the output stream computation step 400.

According to this first embodiment I correlation output streams $z_{s,m}^j(k)$ are computed for each of M resulting streams $r_{s,m}(k)$ obtained from the resulting stream computation step $300_s$. An output stream $z_{s,m}^j(k)$ related to a resulting stream $r_{s,m}(k)$ is obtained by correlating at a given time instant k the resulting stream $r_{s,m}(k)$ with a comb of L pulses $cp^j$ related to one of said I weighting codes $MC^j$. Each pulse of the comb of pulses $cp^j$ is separated to each other by N positions and each pulse q of the comb of pulses $cp^j$ is weighted by a component $c_q^j$ of a weighting code $MC^j$.

FIG. 10 represents a diagram of a second embodiment of the output stream computation step 400.

According to this second embodiment, the set of I weighting codes $MC^j$ is a set of orthogonal codes from which a fast transform TRANS is obtained. Each of said weighting codes is a Hadamard code according to a first example, and a Fourier code according to a second example.

In the course of the output stream computation step 400, I output streams $z_{s,m}^j(k)$ are computed for each of M resulting streams $r_{s,m}(k)$ obtained from the resulting stream computation step $300_s$. Each of I output streams $z_{s,m}^j(k)$ related to a resulting stream $r_{s,m}(k)$ is obtained by processing L pulses $r_{s,m}(k), r_{s,m}(k+N), \ldots, r_{s,m}(k+(L-1).N)$, selected from the resulting stream $r_{s,m}(k)$ and separated to each other by N positions, with the fast transform TRANS obtained from the I orthogonal weighting codes $MC^j$.

Thus, according to these two embodiments of the output stream computation step 400, I output streams $z_{s,m}^j(k)$ are obtained for each resulting stream $r_{s,m}(k)$.

FIG. 11 represents a diagram of a third embodiment of the output stream computation step 400.

According to this embodiment, a single output stream $z_{s,m}(k)$ is computed for each of M resulting streams $r_{s,m}(k)$ obtained from the resulting stream computation step $300_s$.

The single output stream $z_{s,m}(k)$ is given at a time instant k by $$z_{s,m}(k) = \sqrt{\sum_{\ell=0}^{L-1} |r_{s,m}(k + \ell \cdot N)|^2}$$

where $|r_{s,m}(k+l.N)|^2$ is the energy of a pulse separated by l.N positions from the first of L pulses. Said L pulses $r_{s,m}(k), r_{s,m}(k+N), \ldots, r_{s,m}(k+(L-1).N)$ are selected from the resulting stream $r_{s,m}(k)$ and separated to each other by N positions.

When the received signal is not the signal Tsg(k) transmitted by the transmitter TRD, none of output streams $z_{s,m}^j(k)$, respectively $z_{s,m}(k)$, obtained at the output of the output stream computation step 400 if one of the two first embodiments, respectively the third embodiment, of the output stream computation step 400 is used, carries a peak which can be considered as the single peak from which the synchronisation in time of a signal frame is reached.

But, when the received signal is the signal Tsg(k), such a single peak appears at the time $k_{best}$ in at least one of output streams $z_{s,m}^{jbest}(k)$, respectively $z_{s,m}(k)$. The signal frame which is being received is then said synchronised in time and, as mentioned in the opening paragraph, the receiver is able to determine precisely the beginning of said signal frame and thus the beginning of the synchronisation sequence $x^j(k)$ carried by said signal frame.

Note that the weighting code $MC^{jbest}$ which is carried by the received synchronisation sequence $y_s(k)$ is deduced directly from the stream $z_{s_{best},m_{best}}^{jbest}(k)$ obtained from the antenna $RANT_{sbest}$ following the maximisation of the decision value described later.

Mathematically speaking, such a single peak appears in a time window which is centered on the time instant $k_{best}$ and which is of duration u equal in the general case to (L.N+2.W) because the coefficient $\beta^{jbest}(k)$ over such a time window may be rewritten as $$\beta_{[u]}^{jbest}(k) = \sum_{l=0}^{L-1} c_l^{jbest}.2.N.\delta(k - W - l.N - u) \quad (8)$$

An output stream $z_{s,m}^{jbest}(k)$ in which the single peak appears is then given by:

$$z_{s,m}^{jbest}(k) = \sum_{n=0}^{L-1} r_{[u]}(k + n.N).c_n^{*jbest} \quad (9)$$

By including equation (7) in which the sequences $\beta^{jbest}(k)$ is given by equation (8) in equation (9), and following some mathematical manipulations, said correlation output stream $z_{s,m}^{jbest}(k)$ is given by $$z_{s,m}^{jbest}(k) = \sum_{p=0}^{P-1}\sum_{l=0}^{L-1}\sum_{n=0}^{L-1} c_l^{jbest}.c_n^{*jbest}.2.N.h_{p,s}(k - W - l.N + n.N - u) +$$
$$\sum_{n=0}^{L-1} c_n^{*jbest}.\alpha_{k+n.N}$$

Note also that the weighting code $MC^{jbest} = \{c_0^{jbest}, \ldots, c_{L-1}^{jbest}\}$ can not be deduced directly from said at least one output stream $z_{s,m}(k_{best})$ In that case, the first components $c_0^j$ of each weighting code are all identical avoiding thus at the receiver any phase ambiguity due to the channel. The information, represented by each weighting code, is then carried by each of (L−1) components $c_q^j = \{1, \ldots, L-1\}$ following the first component $c_0^j$ and each component $c_q^j = \{1, \ldots, L-1\}$ is differentially encoded from its first component. A soft estimate $\hat{c}_q^j$ of each of (L−1) components $c_q^j$ is then obtained from (L−1) peaks $r_{s,m}(k_{best}+N), \ldots, r_{s,m}(k_{best}+(L-1).N)$ of at least one single resulting streams $r_{s,m_{best}}(k)$ related each to the output stream $z_{s,m_{best}}(k)$ obtained from an antenna $RANT_s$ following the maximisation of the decision value described later.

According to a first embodiment to retrieve the weighting code $MC^{jbest} = \{c_0^{jbest}, \ldots, c_{L-1}^{jbest}\}$, the soft estimate $\hat{c}_q^{jbest}$ is given by:

$$\hat{c}_q^{j_{best}} = \frac{\sum_{s=1}^{NANT} \left[ r_{s,m_{best}}^*(k_{best}) \cdot r_{s,m_{best}}(k_{best} + q.N) \right]}{\sqrt{\sum_{s=1}^{NANT} |r_{s,m_{best}}(k_{best})|^2}}$$

where $r_{s,m_{best}}^*(k_{best})$ is the complex conjugate of the first peak and $|r_{s,m_{best}}(k_{best})|$ is the module of the first peak. Note that according to the above equation, the phase rotation and amplitude of the peak $r_{s,m_{best}}(k_{best}+q.N)$ are corrected before retrieving the component $\hat{c}_q^{j_{best}}$ of the weighting code.

According to a second embodiment to retrieve the weighting code $MC^{j_{best}} = \{c_0^{j_{best}}, \ldots, c_{L-1}^{j_{best}}\}$, the soft estimate $\hat{c}_q^{j_{best}}$ is given by:

$$\hat{c}_q^{j_{best}} = \frac{\sum_{s=1}^{NANT} \left[ \frac{\sqrt{G_s} \cdot r_{s,m_{best}}^*(k_{best}) \cdot r_{s,m_{best}}(k_{best} + q.N)}{|r_{s,m_{best}}(k_{best})|} \right]}{\sqrt{\sum_{s=1}^{NANT} G_s}}$$

with $G_s = \frac{\sum_{\ell=0}^{L-1} |r_{s,m_{best}}(k_{best} + (\ell-1).N)|^2}{L}$.

Note that according to this above equation, the phase rotation and amplitude of the peak $r_{s,m_{best}}(k_{best}+q.N)$ are also corrected before retrieving the component $\hat{c}_{q_{best}}^j$ of the weighting code.

Each component of the weighting code carried by the received synchronisation sequence is thus retrieved by combining resulting streams obtained from each antenna $RANT_s$. This is a general approach which includes the case where a single antenna in considered ($N_{ANT}=1$).

According to a first embodiment of the time instant determination and weighting code retrieval step 500, at a time instant k, a decision value is computed for each output streams $z_{s,m}^j(k)$, respectively $z_{s,m}(k)$, obtained at the output of the output stream computation step 400 if one of the two first embodiments, respectively the third embodiment, of the output stream computation step 400 is used.

When an output stream $z_{s,m}^j(k)$ is obtained from the output stream computation step 400, according to a first embodiment of the decision value computation, the decision value $S_{s,m}^j(k)$ computed at the time instant k for said output stream $z_{s,m}^j(k)$ is given by $$S_{s,m}^j(k) = |z_{s,m}^j(k)|^2$$

and according to a second embodiment, the decision value $S_{s,m}^j(k)$ at the time instant k for said output stream $z_{s,m}^j(k)$ is computed by a correlation merit factor defined by $$S_{s,m}^j(k) = \frac{|z_{s,m}^j(k)|^2}{\frac{1}{K_1+K_2}\left[\sum_{l=1}^{K_1} |z_{s,m}^j(k-l)|^2 + \sum_{l=1}^{K_2} |z_{s,m}^j(k+l)|^2\right]}$$

where $|z_{s,m}^j(k)|^2$ is the energy at the time instant k of the output stream $z_{s,m}^j(k)$ and $$\frac{1}{K_1+K_2}\left[\sum_{l=1}^{K_1} |z_{s,m}^j(k-l)|^2 + \sum_{l=1}^{K_2} |z_{s,m}^j(k+l)|^2\right]$$

is the energy of the output stream $z_{s,m}^j(k)$ averaged on the two time intervals of size $K_1$ and $K_2$ defined respectively before and after the time instant k.

The maximisation of the decision value is then given by $$(k_{best}, j_{best}, m_{best}, s_{best}) = \underset{k,m,s,j}{\mathrm{argmax}}(S_{s,m}^j(k))$$

independently of the embodiment of the decision value computation.

By selecting the output stream $z_{s_{best},m_{best}}^{j_{best}}(k)$ which maximises the decision value $S_{s,m}^j(k)$ at the time instant $k_{best}$, a coarse estimation of the frequency drift is also obtained by the possible frequency offset value $\Delta f_{m_{best}}$ and the weighting code $MC^{j_{best}}$ related to said output stream $z_{s_{best},m_{best}}^{j_{best}}(k)$ is deduced by the receiver RCD as above-explained.

FIG. 12 represents a chronogram which depicts the computation of the decision value $S_{s,m}^j(k)$, according to the second embodiment, at the time instant $(k_{best}-1)$ and at the time instant $k_{best}$ for an output stream $z_{s,m}^j(k)$. The decision value $S_{s,m}^j(k)$ is computed at a time instant k from the first time interval defined over $K_1$ times the duration separating two successive pulses of the output stream $z_{s,m}^j(k)$. Said first time interval ends at the time instant (k-1). The decision value $S_{s,m}^j(k)$ is also computed from the second time interval defined over $K_2$ times the duration separating two successive pulses of the output stream $z_m^j(k_r)$. Said second time interval starts at the time instant (k+1).

The example shows that the decision value $S_{s,m}^j(k)$ is maximal at the time instant $k_{best}$, i.e. when the decision value is computed at the time instant at which the single peak appears in the output stream $z_{s,m}^j(k)$.

When an output stream $z_{s,m}(k)$ is obtained from the output stream computation step 400, according to an embodiment of the decision value computation, the decision value $S_{s,m}(k)$ computed at the time instant k for said output stream $z_{s,m}(k)$ is given by $$S_{s,m}(k) = |z_{s,m}(k)|^2$$

and according to another embodiment, the decision value $S_{s,m}(k)$ at the time instant k for said output stream $z_{s,m}(k)$ is computed by a correlation merit factor defined by $$S_{s,m}(k) = \frac{|z_{s,m}(k)|^2}{\frac{1}{K_1+K_2}\left[\sum_{l=1}^{K_1} |z_{s,m}(k-l)|^2 + \sum_{l=1}^{K_2} |z_{s,m}(k+l)|^2\right]}$$

where $|z_{s,m}(k)|^2$ is the energy at the time instant k of the output stream $z_{s,m}(k)$ and $$\frac{1}{K_1+K_2}\left[\sum_{l=1}^{K_1} |z_{s,m}(k-l)|^2 + \sum_{l=1}^{K_2} |z_{s,m}(k+l)|^2\right]$$

is the energy of the output stream $z_{s,m}(k)$ averaged on the two time intervals of size $K_1$ and $K_2$ defined respectively before and after the time instant k.

The maximisation of the decision value is then given by $$(k_{best}, m_{best}) = \underset{k,m}{\mathrm{argmax}}(S_{s,m}(k))$$

independently of the embodiment of the decision value computation.

By selecting the output streams $z_{s,m_{best}}(k)$ which maximise the decision value $S_{s,m}(k)$ at time instant $k_{best}$, a coarse estimation of the frequency drift is obtained by the possible frequency offset value $\Delta f_{m_{best}}$.

According to a second embodiment of the time instant determination and weighting code retrieval step 500, at a time instant k, a decision value is computed for at least one combination of either output streams $z_{s,m}^j(k)$, respectively $z_{s,m}(k)$, obtained at the output of the output stream computation step 400 if one of the two first embodiments, respectively the third embodiment, of the output stream computation step 400 is used.

When one of the two first embodiments of the output stream computation step 400 is used, a combination of output streams $z_{s,m}^j(k)$ is related to either one of I weighting codes $MC^j$ or one of M frequency offsets $\Delta f_m$ or one of M frequency offsets $\Delta f_m$ and one of I weighting codes $MC^j$.

In case M=1, when a combination of output streams $z_{s,1}^j(k)$ is related to a weighting code $MC^i$, only the output streams $z_{s,1}^{j=i}(k)$ related to this weighting code are considered from each antenna $RANT_s$. When a combination of output streams $z_{s,m}^j(k)$ is related to both a frequency offset $\Delta f_\mu$ and a weighting code $MC^i$, only one output stream $z_{s,m=\mu}^{j=i}(k)$ is considered from each antenna $RANT_s$.

When the third embodiment of the output stream computation step 400 is used, a combination of output streams $z_{s,m}(k)$ is related to one of M frequency offsets $\Delta f_m$.

When a combination of output streams $z_{s,m}^j(k)$ obtained from the output stream computation step 400 is considered, according to an embodiment of the decision value computation, the decision value $S_m^j(k)$ computed at the time instant k for said combination is given by $$S_m^j(k) = \sum_{s=1}^{NANT} |z_{s,m}^j(k)|^2$$

and according to another embodiment, the decision value $S_m^j(k)$ at the time instant k for said combination is computed by a correlation merit factor defined by $$S_m^j(k) = \frac{\sum_{s=1}^{NANT} |z_{s,m}^j(k)|^2}{\frac{1}{N_{ANT}(K_1+K_2)} \sum_{s=1}^{NANT} \left[ \sum_{l=1}^{K_1} |z_{s,m}^j(k-l)|^2 + \sum_{l=1}^{K_2} |z_{s,m}^j(k+l)|^2 \right]}$$

The maximisation of the decision value is then given by $$(k_{best}, j_{best}, m_{best}) = \underset{k,m,j}{\mathrm{argmax}}(S_m^j(k))$$

independently of the embodiment of the decision value computation.

By selecting the set of output streams $z_{s,m_{best}}^{j_{best}}(k)$ which maximises the decision value $S_m^j(k)$ at the time instant $k_{best}$, an estimation of the frequency drift is obtained by the possible frequency offset value $\Delta f_{m_{best}}$. The weighting code $MC^{j_{best}}$ is also deduced from said set of output streams $z_{s,m_{best}}^{j_{best}}(k)$ by the receiver RCD as above-explained.

When a combination of output streams $z_{s,m}(k)$ obtained from the output stream computation step 400 is considered, according to an embodiment of the decision value computation, the decision value $S_m(k)$ computed at the time instant k for said combination is given by $$S_m(k) = \sum_{s=1}^{NANT} |z_{s,m}(k)|^2$$

and according to another embodiment, the decision value $S_m(k)$ at the time instant k for said combination is computed by a correlation merit factor defined by $$S_m(k) = \frac{\sum_{s=1}^{NANT} |z_{s,m}(k)|^2}{\frac{1}{N_{ANT}(K_1+K_2)} \sum_{s=1}^{NANT} \left[ \sum_{l=1}^{K_1} |z_{s,m}(k-l)|^2 + \sum_{l=1}^{K_2} |z_{s,m}(k+l)|^2 \right]}$$

The maximisation of the decision value is then given by $$(k_{best}, m_{best}) = \underset{k,m}{\mathrm{argmax}}(S_m(k))$$

independently of the embodiment of the decision value computation.

By selecting the set of output streams $z_{s,m_{best}}(k)$ which maximises the decision value $S_m(k)$ at the time instant $k_{best}$, an estimation of the frequency drift is obtained by the possible frequency offset value $\Delta f_{m_{best}}$. As explained in the opening paragraph, a fine frequency correction of the received signal frame may be required. The phase of the received signal evolves linearly in time according to a slope value $\Delta \phi$. The phase of the received signal may then be corrected by the receiver RCD, when the slope value $\Delta \phi$ is estimated.

The classical way to perform an estimation of such a slope value $\Delta \phi$ is to use two or more repetitions of a same sequence of pulses included in the synchronisation sequence $y_s(k)$, and to compute the phase rotation between the repetitions (T.M. Schmidl, D.C. Cox, "Robust frequency and timing synchronization for OFDM," IEEE Transactions on Communications, vol. 45, pp. 1613-1621, no. 12, December 1997). For instance, the respective phases encountered by the first pulse of two consecutive sequences of pulses are $e^{j2\pi(f_0+\Delta f)t_0+\phi_0}$ and $e^{j2\pi(f_0+\Delta f)(t_0+\Delta t)+\phi_0}$, where $\Delta t$ is the time gap between the first pulse of the two sequences of pulses. In base band, the phase rotation between the two consecutive sequences of pulses is hence $\Delta\phi=2\pi\Delta f'\Delta t+2z\pi$, where $\Delta f'$ the frequency offset related to the phase rotation.

To avoid any phase ambiguity it is necessary to respect $-\pi<\Delta\phi<\pi$ which provides the frequency offset estimation range $$-\frac{1}{2\Delta t} < \Delta f' < \frac{1}{2\Delta t}$$

or equivalently $$-\frac{f_s}{V} < \Delta f' < \frac{f_s}{2V}.$$

Obviously, the higher V, the smaller the frequency range.

The slope $\Delta\phi$ may be then estimated for computing a single estimation of this slope when the phase rotation between the first pulses of the two sequences is the same that the phase rotation between the second pulses which is the same that the phase rotation between the third pulses, and so on. This occurs when the pulses of the two received sequences remain identical after having been filtered by the P paths channel $$\sum_{p=0}^{P-1} h_{p,s}(k) \cdot \delta(k-p)$$

where $\delta(k)$ is the Dirac function.

In the present invention, the pulses of the two sequences from which an estimation of the slope is computed, for example two consecutive complementary sequences A, are multiplied by the components of a weighting code. This multiplication involves that the two received sequences are not always identical after having been filtered by the P paths channel. Consequently, the previous estimation approach shall be adapted by using the perfect autocorrelation property of complementary sequences.

According to an embodiment of the present invention, when the received signal frame is synchronised in time and possibly coarsely corrected in frequency, in the course of the time instant determination and weighting code retrieval step 500 the phase of each pulse of the received signal frame is corrected by a linearly increasing value the slope of which, $\hat{\Delta}\phi$, is estimated from a weighted average of P slope estimations $\hat{\Delta}\phi_{p,s}$ obtained for each of said at least one antenna $RANT_s$. The estimate of the slope $\hat{\Delta}\phi$ is thus obtained by $$\hat{\Delta}\varphi = \frac{\sum_{s=1}^{NANT}\sum_{p=0}^{P-1}\left[|\hat{h}_{p,s}|^2 \cdot \hat{\Delta}\varphi_{p,s}\right]}{\sum_{s=1}^{NANT}\sum_{p=0}^{P-1}|\hat{h}_{p,s}|^2}$$

where $|\hat{h}_{p,s}|^2$ is an estimate of the squared amplitude of the path coefficient p for an antenna $RANT_s$ and $\hat{\Delta}\phi_{p,s}$ is the estimate of the slope related to said path p.

According to an embodiment of the estimation of a slope $\hat{\Delta}\phi_{p,s}$, the estimate $\hat{\Delta}\phi_{p,s}$ is obtained by $$\hat{\Delta}\varphi_{p,s} = \frac{\hat{\Delta}\varphi_{p,s}'}{N}$$

where $\hat{\Delta}\phi_{p,s}'$ is the sequence by sequence estimation of the slope given by $$\hat{\Delta}\varphi_{p,s}' = \frac{\sum_{\ell=1}^{L-1}[\varphi[C_{A,p,s}^\ell + C_{B,p,s}^\ell] - \varphi[C_{A,p,s}^{\ell-1} + C_{B,p,s}^{\ell-1}]]}{L-1}$$

where $C_{A,p,s}^l$ and $C_{B,p,s}^l$ are respectively a first and a second correlation factors computed from respectively the first and the second complementary sequence of rank 1 of the received synchronisation sequence, and $\phi(C_{A,p,s}^l+C_{A,p,s}^l)$ is the phase of the sum of the first and second correlation factors.

The squared amplitude of a path coefficient p for an antenna $RANT_s$ is then estimated by $$|\hat{h}_{p,s}|^2 = \frac{1}{L}\sum_{\ell=0}^{L-1}|C_{A,p,s}^\ell + C_{B,p,s}^\ell|^2$$

FIG. 13 shows how two correlation factors $C_{A,p,s}^l$ and $C_{B,p,s}^l$ related to a path p are computed.

The first correlation factors $C_{A,p,s}^l$ $l\in\{0,\ldots,L-1\}$ related to a path p are computed at a time instant k from a N pulses long segment of a first complementary sequence A by $$C_{A,p,s}^\ell = \sum_{k=W+p}^{W+p+N-1} y_s(k) \cdot A(k)$$

$$= \sum_{k=0}^{N-1}\sum_{p=0}^{P-1} h_{p,s} \cdot A(k-p) e^{j2\pi\Delta f'(k+W)/f_s+j\varphi_0} \cdot A(k) + \sum_{k=W+p}^{W+p+N-1} n(k) \cdot A(k)$$

The second correlation factors $C_{B,p,s}^l$ $l\in\{0,\ldots,L-1\}$ related to a path p are computed at a time instant k from a N pulses long segment of a first complementary sequence B by $$C_{B,p,s}^\ell = \sum_{k=W+p}^{W+p+N-1+u} y_s(k) \cdot B(k)$$

$$= \sum_{k=0}^{N-1}\sum_{p=0}^{P-1} h_{p,s} \cdot B(k-p) e^{j2\pi\Delta f'(k+W+u)/f_s+j\varphi_0} \cdot B(k) +$$

$$\sum_{k=W+p}^{W+p+N-1} n(k) \cdot B(k)$$

By summing the two correlation factors and using the perfect autocorrelation property of complementary sequences given by equation (1), we obtain $$C_{A,p,s}^l + C_{B,p,s}^l = h_p e^{j2\pi\Delta f'N(l-1)/f_s+j\phi_0}$$

The stream which carries a single peak from which a signal frame is synchronised in time exhibits possibly secondary peaks which are due to bad autocorrelation properties of weighting codes. This drastically increases the detection error probability of the single peak. According to one of the embodiments of the synchronisation method or one of their variants, in order to counter fight this problem, the I weighting codes $MC^j$ are multiplied by a same scrambling code in the course of the synchronisation sequence generation step 100, and the I weighting codes $MC^j$, used in the course of the single peak detection step 300 are also multiplied by said scrambling code. Such a scrambling is, for example the well-known Barker code ("Sequence design for communications applications" P. Fan, M. Darnell, , pp.270-272, Wiley, New York, 1996),) which bounds the norm of said secondary peaks to be N times lower than the norm of the main peak.

According to another aspect of the present invention, the signal Tsg(k) is transmitted from multiple antennas $TANT_s$. The method for synchronising according to the present invention is then characterised in that the transmitter TRD transmits the same signal Tsg(k) from each of said antenna $TANT_s$ with minor different time delays.

According to one of its hardware-oriented aspects, the present invention relates to the transmitter TRD and the receiver RCD of the telecommunication system SYST.

FIG. 14 represents a schema of the transmitter TRD intended to execute the synchronisation sequence generation step 100 and the sequence weighting step 200 according to the present invention.

The transmitter TRD is intended to generate a synchronisation sequence $x^i(k)$ given by equation (2) and to transmit to the receiver RCD a signal frame which includes said generated synchronisation sequence. For generating the synchronisation sequence $x^i(k)$, the transmitter TRD includes a pulse generator SGM for generating a pair of complementary sequences A and B, a burst creator BC for creating a first burst of L sequences A and a second burst of L sequences B from said pair of complementary sequences (A,B), and a multiplier WGM for multiplying the pulses of each complementary sequence A of rank q of the first burst of L sequences by the component of rank q of a L components long weighting code $MC^i$, and for multiplying the pulses of each sequence of rank q of the second burst of L sequences by the same component of rank q of said weighting code $MC^i$.

According to an embodiment of the burst creator BC, at least one guard interval, defined by a W bits long cyclic extension of either the first or second complementary sequence is included in the synchronisation sequence $x^i(k)$. Said at least one guard interval is located either at the beginning or at the end of the first burst of L sequences when said at least one guard interval is defined from the first complementary sequence A, and said at least one guard interval is located either at the beginning or at the end of the second burst of L sequences when said at least one guard interval is defined from the second complementary sequence B.

According to an embodiment of the multiplier WGM, the weighting code $MC^i$ belonging to a set of I weighting codes, the set of I weighting codes is a set of orthogonal codes from which a fast transform may be obtained. For example, each weighting code is a Hadamard code or a Fourier code.

According to a variant of this embodiment, the weighting codes $MC^i$ are multiplied by a same scrambling code which is for example a Barker code.

The transmitter TRD is equipped by at least one antenna TANT from which the signal Tsg(k) is transmitted. When the transmitter TRD is equipped by multiple antennas TANT according to an embodiment of the present invention, the same signal Tsg(k) is transmitted from each of said antenna with minor different time delays. Note that the transmission on multiple antennas TANT does not have any impact on the processings executed by the receiver RCD which remain identical to those above-described.

FIG. 15 represents a schema of the receiver RCD intended to synchronise in time and possibly correct in frequency a received signal frame according to the present invention.

The receiver RCD, which is equipped by at least one antennas $RANT_s$ intended each to receive a signal frame, is characterised in that it includes for each of said at least one antenna $RANT_s$, means RSM for obtaining at least one resulting stream from the signal which is being received by the antenna $RANT_s$.

The means RSM includes
  at least one time-shifter TSV for computing a time-delayed version of the received signal,
  at least one first correlator FCS1 for correlating the time-delayed version of the received signal with a replica of the first complementary sequence A of the pair of complementary sequences (A,B),
  at least one second correlator FCS2 for correlating the time-delayed version of the received signal with a replica of the first complementary sequence B of the pair of complementary sequences (A,B), and
  at least one correlation stream combiner SA for forming a resulting stream from the first correlation stream and the second correlation stream.

For example, if Golay sequences are used the correlators FCS1 and FCS2 are replaced by a well-known Extended Golay Correlator.

Moreover, the receiver RCD includes a resulting stream combiner RSC for obtaining at least one output stream for each of said at least one resulting stream, means DV for computing at least one decision value at a time instant from said at least one output stream or at least one combination of said output streams and means DVM for maximising said at least one decision value.

According to an embodiment of the receiver RCD, it includes also means CFM1 for correcting in frequency the phase of pulses of a second correlation stream related to a same complementary sequence by a constant value related to a predefined frequency offset value.

According to another embodiment of the receiver RCD, it includes means CFM2 for correcting the phase of each pulse of the received signal by a linearly increasing value the slope of which is related to a predefined frequency offset value.

According to a first embodiment of the means DV, each decision value computed at a time instant related to an output stream, respectively a combination of output streams, is the squared norm of said output stream, respectively the combined output stream, evaluated at said time instant.

According to a second embodiment of the means DV, each decision value computed at a time instant related to an output stream, respectively a combination of output streams, is a correlation merit factor as above-described According to an embodiment of the resulting stream combiner RSC, depicted in FIG. 16a, the resulting stream combiner RSC is a bunch of correlators COj which are each intended to correlate at a given time instant a resulting stream with a comb of pulses related to a weighting code as above-explained.

According to another embodiment of the resulting stream combiner RSC, depicted in FIG. 16b, the weighting code belonging to a set of I weighting codes which is a set of orthogonal codes from which a fast transform may be obtained, the resulting stream combiner RSC includes means for processing L pulses of a resulting stream separated to each other by N positions by said fast transform.

According to another embodiment of the resulting stream combiner RSC, depicted in FIG. 16c, the resulting stream combiner RSC includes means for computing at a time instant the square root of the sum of the energy of L pulses separated by N positions from each other of said resulting stream.

The receiver RCD includes, according to this embodiment, a weighting code retriever WCR which includes means for obtaining a soft estimate of a component of rank q of the weighting code carried by the received signal frame from the product of the sum of the phase rotation and amplitude corrected peaks of rank q of said at least one single resulting stream by a weighting value. The phase rotation and amplitude of peaks of rank q are corrected as above-explained.

According to another embodiment of the receiver RCD, the receiver RCD includes means for correcting the phase of each pulse of a received signal frame by a linearly increasing value the slope of which is obtained from a weighted average of at least P slope estimations obtained for each of said at least one antennas. The P slope estimations are obtained as above-explained.

The invention claimed is:

1. A method for synchronising a signal frame transmitted by a transmitter of a telecommunication system to a receiver adapted to synchronise said signal frame from a synchronisation sequence included in said signal frame, the method comprising:
   a synchronisation sequence generation step executed by the transmitter in which the synchronisation sequence is formed by a concatenation of first and second bursts of L complementary sequences, said first burst of L sequences being obtained by a concatenation of L times a first N pulses complementary sequence of a pair of complementary sequences, said second burst of L sequences being obtained by a concatenation of L times a second N pulses complementary sequence of said pair of complementary sequences, and
   a sequence weighting step executed by the transmitter in which pulses of each complementary sequence of rank q of the first burst of L sequences are multiplied by a component of rank q of an L components long weighting code belonging to a set of I weighting codes known by the receiver beforehand, and pulses of each complementary sequence of rank q of the second burst of L sequences are multiplied by the same component of rank q of said weighting code.

2. The method for synchronising as claimed in claim 1, wherein, in the synchronisation sequence generation step at least one guard interval, defined by a W bits long cyclic extension of either the first or second complementary sequence is included in the synchronisation sequence, said at least one guard interval being located either at a beginning or at an end of the first burst of L sequences when said at least one guard interval is defined from the first complementary sequence, and said at least one guard interval being located either at a beginning or at an end of the second burst of L sequences when said at least one guard interval is defined from the second complementary sequence.

3. The method for synchronising as claimed in claim 2, wherein
   two guard intervals are defined by W bits long cyclic extensions of the first complementary sequence, one of said guard intervals being located at the beginning of the first burst of L sequences and the other one being located at the end of the first burst of L sequences, and
   two guard intervals are defined by W bits long cyclic extensions of the second complementary sequence, one of said guard intervals being located at the beginning of the second burst of L sequences and the other one being located at the end of the second burst of L sequences.

4. The method for synchronising as claimed in one of claims 1 to 3, wherein the set of I weighting codes is a set of orthogonal codes from which a fast transform is obtained.

5. The method for synchronising as claimed in claim 4, wherein each weighting code is a Hadamard code.

6. The method for synchronising as claimed in claim 4, wherein each weighting code is a Fourier code.

7. The method for synchronising as claimed in claim 4, wherein the weighting codes are multiplied by a same scrambling code.

8. The method for synchronising as claimed in claim 7, wherein the scrambling code is a Barker code.

9. The method for synchronising as claimed in claim 1, the receiver being equipped by at least one antenna each to receive said signal frame, wherein the method further includes,
   for each of said at least one antenna, a resulting stream computation step in which at least one resulting stream is obtained from a signal which is being received by the antenna,
   said resulting stream computation step includes
      at least one time-shifting sub-step in each of which a time-delayed version of the received signal is computed,
      at least one first sequence correlation sub-step in each of which a first correlation stream is computed by correlating the time-delayed version of the received signal with a replica of the first complementary sequence of the pair of complementary sequences,
      at least one second sequence correlation sub-step in each of which a second correlation stream is computed by correlating the received signal with a replica of the second complementary sequence of the pair of complementary sequences,
      at least one stream summation sub-step in each of which a resulting stream is formed from the first correlation stream and the second correlation stream,
   an output stream computation step in which at least one output stream is obtained for each of said at least one resulting stream, and
   a time instant determination and weighting code retrieval step in which at least one decision value at a time instant is computed from said at least one output stream, a time instant, at which the signal frame which is received is synchronised in time, is then obtained by maximising said at least one decision value, and a weighting code carried by the received synchronisation sequence is retrieved from L peaks, separated by N positions from each other, of at least one of said at least one resulting stream obtained from said maximised decision value, a first of said L peaks of each of said at least one resulting stream being located at the time instant at which the signal frame is synchronised in time.

10. The method for synchronising as claimed in claim 9, wherein
   said at least one resulting stream computation step includes
      a single time-shifting sub-step which a time-delayed version of the received signal is computed,
      a single first sequence correlation sub-step in which a first correlation stream is computed by correlating the time-delayed version of the received signal with a replica of the first complementary sequence of the pair of complementary sequences,
      a single second sequence correlation sub-step in which a second correlation stream is computed by correlating the received signal with a replica of the second complementary sequence of the pair of complementary sequences, and a single stream summation sub-step in which a resulting stream is formed by summing said first correlation stream and said second correlation stream.

11. The method for synchronising as claimed in claim 9, M frequency offset values being predefined by the receiver from a range of possible frequency drifts, wherein said at least one resulting stream computation step includes a single time-shifting sub-step in which a time-delayed version of the received signal is computed, a single first sequence correlation sub-step in which a first correlation stream is computed by correlating the time-delayed version of the received signal with a replica of the first complementary sequence of the pair of complementary sequences, a single second sequence correlation sub-step in which a second correlation stream is computed by correlating the received signal with a replica of the second complementary sequence of the pair of complementary sequences, M coarse sequence by sequence frequency correction sub-steps in each of which a phase of pulses of said second correlation stream related to a same complementary sequence is corrected by a constant value related to one of said M frequency offset values, and M stream summation sub-steps in each of which a resulting stream is formed by summing the first correlation stream and one of said M corrected second correlation streams.

12. The method for synchronising as claimed in claim 9, M frequency offset values being predefined by the receiver from a range of possible frequency drifts, wherein said at least one resulting stream computation step includes M coarse pulse by pulse frequency correction sub-steps in each of which a phase of each pulse of the received signal is corrected by a linearly increasing value a slope of which is related to one of said M frequency offset values, M time-shifting sub-steps in each of which a time-delayed version of one of said M received and phase corrected signals is computed, M first sequence correlation sub-steps in each of which a first correlation stream is computed by correlating the time-delayed version of one of said M received and phase corrected signals with a replica of the first complementary sequence of the pair of complementary sequences, M second sequence correlation sub-steps in each of which a second correlation stream is computed by correlating one of said M received and phase corrected signals with a replica of the second complementary sequence of the pair of complementary sequences, and M stream summation sub-steps in each of which a resulting stream is formed from one of said M first correlation streams and one of said M second correlation streams related to the same received and phase corrected signal.

13. The method for synchronising as claimed in claim 9, wherein, in the time instant determination and weighting code retrieval step at a time instant a decision value is computed for each of said at least one output stream obtained from each of said at least one antenna.

14. The method for synchronising as claimed in claim 9, wherein, in the time instant determination and weighting code retrieval step at a time instant a decision value is computed for at least one combination of said at least one output stream, each of said at least one combination, which is related to either one of said I weighting codes or one of M frequency offsets and one of said I weighting codes, is defined by a square root of a sum of squared modules of output streams obtained from said at least one antenna which are related to either a same weighting code or the same weighting code and a same frequency value.

15. The method for synchronising as claimed in claim 13, wherein, in the time instant determination and weighting code retrieval step each decision value computed at a time instant related to an output stream, respectively a combination of output streams, is a squared norm of said output stream, respectively a combined output stream, evaluated at said time instant.

16. The method for synchronising as claimed in claim 13, wherein, in the time instant determination and weighting code retrieval step each decision value computed at a time instant related to an output stream, respectively a combination of output streams, is a correlation merit factor defined by a ratio of an energy at said time instant of said output stream, respectively said combination of output streams, divided by an energy of said output stream, respectively said combination of output streams, averaged on two time intervals defined respectively before and after said time instant.

17. The method for synchronising as claimed in claim 9, wherein, in the output stream computation step, I output streams are obtained for each of said at least one resulting stream, each of said I output streams related to one of said at least one resulting stream being obtained by correlating at a given time instant said resulting stream with a comb of pulses related to one of said I weighting codes, each pulse of a comb related to a weighting code being separated to each other by N positions and each pulse of said comb being weighted by a component of said weighting code.

18. The method for synchronising as claimed in claim 9, the set of I weighting codes being a set of orthogonal codes from which a fast transform is obtained, wherein, in the output stream computation step, I output streams are obtained for each of said at least one resulting stream, each of said I output streams related to each of said at least one resulting stream being obtained by processing L pulses of said resulting stream separated to each other by N positions with said fast transform.

19. The method for synchronising as claimed in claim 9, wherein, in the output stream computation step, a single output stream is obtained for each of said at least one resulting stream by computing at a time instant a squared root of a sum of an energy of L pulses separated by N positions from each other of said resulting stream.

20. The method for synchronising as claimed in claim 19, each of (L−1) components following a first component of each of said I weighting codes being differentially encoded from the first component, the signal frame being possibly corrected in frequency, L peaks, separated by N positions from each other, of a single resulting stream obtained from said maximised decision value and related to each of said at least one antenna being considered, a first of said L peaks of the single resulting stream being located at the time instant at which the signal frame is synchronised in time, wherein a soft estimate of a component of rank q of the weighting code carried by the received signal frame is obtained from a product of a sum of phase rotation and amplitude corrected peaks of rank q of said single resulting stream by a weighting value.

21. The method for synchronising as claimed in claim 20, wherein a phase rotation and an amplitude of said peaks of rank q are corrected by multiplying said peaks of rank q by a complex conjugate of a peak preceding said (L−1) peaks and said weighting value is a square root of a sum of a square of a module of peaks preceding the (L−1) peaks of each of said single resulting stream.

22. The method for synchronising as claimed in claim 20, wherein a phase rotation and an amplitude of said peaks of rank q are corrected by multiplying said peaks of rank q by a product of a complex conjugate of a peak preceding said (L−1) peaks divided by a module of the peak by a square root of an average energy of said L peaks, and said weighting value is a square root of a sum of average energies of said L peaks obtained for each of said single resulting stream.

23. The method for synchronising as claimed in claim 1, the signal frame received by at least one antenna being transmitted on a multipath channel having P consecutive paths and being synchronised in time and possibly coarsely corrected in frequency, wherein, in a time instant determination and weighting code retrieval step, a phase of each pulse of a received signal frame is corrected by a linearly increasing value a slope of which is obtained from a weighted average of at least P slope estimations obtained for each of said at least one antenna, each of said at least P slope estimations being weighted by an estimate of a squared amplitude of one of P path coefficients, a weighting value of said average being a sum of a squared amplitude of said P path coefficients.

24. The method for synchronising as claimed in claim 23, wherein each slope estimation related to a path coefficient is obtained by a ratio of a sequence by sequence slope estimation related to said path coefficient over N, said sequence by sequence slope estimation being defined by an average of (L−1) differences between a phase of a sum of first and second correlation factors related to said path coefficient and computed at a first time instant on a segment of respectively a first and a second complementary sequence of the received synchronisation sequence and a phase of a sum of first and second correlation factors related to said path coefficient and computed at a second time instant on a segment of respectively a first and a second complementary sequence of the received synchronisation sequence.

25. The method for synchronising as claimed in claim 1, the signal frame being transmitted from multiple antennas, wherein the transmitter transmits the same signal frame from each of said multiple antennas with minor different time delays.

26. The method for synchronising as claimed in claim 1, wherein the complementary sequences are Golay sequences.

27. A transmitter of a telecommunication system to transmit a signal frame to a receiver adapted to synchronise said signal frame from a synchronisation sequence included in said signal frame, the transmitter comprising:
   a pulse generator for generating a pair of complementary sequences
   a burst creator for creating a first burst of L sequences and a second burst of L sequences from said pair of complementary sequences, and
   a multiplier for multiplying pulses of each complementary sequence of rank q of the first burst of L sequences by a component of rank q of an L components long weighting code, and for multiplying pulses of each complementary sequence of rank q of the second burst of L sequences by the same component of rank q of said weighting code.

28. The transmitter as claimed in claim 27, wherein at least one guard interval, defined by a W bits long cyclic extension of either the first or second complementary sequence is included in the synchronisation sequence, said at least one guard interval is located either at a beginning or at an end of the first burst of L sequences when said at least one guard interval is defined from the first complementary sequence, and said at least one guard interval is located either at a beginning or at an end of the second burst of L sequences when said at least one guard interval is defined from the second complementary sequence.

29. The transmitter as claimed in one of claims 27 to 28, wherein said weighting code belongs to a set of I weighting codes, and the set of I weighting codes is a set of orthogonal codes from which a fast transform may be obtained.

30. The transmitter as claimed in claim 29, wherein each weighting code is a Hadamard code.

31. The transmitter as claimed in claim 29, wherein each weighting code is a Fourier code.

32. The transmitter as claimed in claim 29, wherein the weighting codes are multiplied by a same scrambling code.

33. The transmitter as claimed in claim 27, the transmitter being equipped by multiple antennas from which a signal is transmitted, wherein the same signal is transmitted from each of said multiple antennas with minor different time delays.

34. A telecommunication system including the transmitter as claimed in claim 27, transmitter to transmit the signal frame to at least one receiver of said telecommunication system.

35. A signal frame transmitted from a transmitter of a telecommunication system to a receiver adapted to synchronise said signal frame from a synchronisation sequence included in said signal frame, wherein the synchronisation sequence is formed by a concatenation of first and second bursts of L complementary sequences, said first burst of L sequences being obtained by a concatenation of L times a first N pulses complementary sequence of a pair of complementary sequences, said second burst of L sequences being obtained by a concatenation of L times a second N pulses complementary sequence of said pair of complementary sequences, pulses of each complementary sequence of rank q of the first burst of L sequences being multiplied by a component of rank q of a L components long weighting code belonging to a set of I weighting codes known by the receiver beforehand, and pulses of each complementary sequence of rank q of the second burst of L sequences being multiplied by the same component of rank q of said weighting code.

36. The signal frame as claimed in claim 35, wherein said synchronisation sequence further includes at least one guard interval, defined by a W bits long cyclic extension of either the first or second complementary sequence, said at least one guard interval being located either at a beginning or at an end of the first burst of L sequences when said at least one guard interval is defined from the first complementary sequence, said at least one guard interval being located either at a beginning or at an end of the second burst of L sequences when said at least one guard interval is defined from the second complementary sequence.

37. The signal frame as claimed in one of claim 35 or 36, the weighting code belonging to a set of I weighting codes, wherein the set of I weighting codes is a set of orthogonal codes from which a fast transform is obtained.

38. The signal frame as claimed in claim 35, wherein the weighting codes are multiplied by a same scrambling code.

* * * * *